United States Patent
Bealkowski et al.

[19]
[11] Patent Number: 5,878,256
[45] Date of Patent: Mar. 2, 1999

[54] METHOD AND APPARATUS FOR PROVIDING UPDATED FIRMWARE IN A DATA PROCESSING SYSTEM

[75] Inventors: Richard Bealkowski, Delray Beach; Ralph Murray Begun, Boca Raton; Louis Bennie Capps, Jr., Boynton Beach, all of Fla.

[73] Assignee: International Business Machine Corp., Armonk, N.Y.

[21] Appl. No.: 777,844

[22] Filed: Oct. 16, 1991

[51] Int. Cl.⁶ .................................................. G06F 12/00
[52] U.S. Cl. ........................... 395/652; 395/712; 711/103
[58] Field of Search .................................. 395/425, 500, 395/575, 712, 652; 364/900, 268; 340/301.1; 711/103, 154

[56] References Cited

U.S. PATENT DOCUMENTS

| | | | |
|---|---|---|---|
| 4,456,993 | 6/1984 | Taniguchi et al. | 371/10 |
| 4,607,332 | 8/1986 | Goldberg | 395/375 |
| 4,648,031 | 3/1987 | Jenner | 395/575 |
| 4,739,346 | 4/1988 | Soderberg et al. | 364/464 |
| 4,758,988 | 7/1988 | Kuo | 365/189 |
| 4,802,117 | 1/1989 | Chrosny et al. | 371/11.1 |
| 4,811,303 | 3/1989 | Hirai | 365/189 |
| 4,823,252 | 4/1989 | Horst et al. | 371/8 |
| 4,839,628 | 6/1989 | Davis et al. | 340/311.1 |
| 4,893,279 | 1/1990 | Rahman et al. | 365/230.03 |
| 4,937,861 | 6/1990 | Cummins | 380/2 |
| 4,965,828 | 10/1990 | Ergott, Jr. et al. | 380/50 |
| 5,007,082 | 4/1991 | Cummins | 380/4 |
| 5,021,963 | 6/1991 | Brown et al. | 364/464.02 |
| 5,032,981 | 7/1991 | Bril et al. | 395/400 |
| 5,062,080 | 10/1991 | Goldsmith | 365/230.01 |
| 5,129,080 | 7/1992 | Smith | 395/575 |
| 5,210,854 | 5/1993 | Beaverton et al. | 395/500 |
| 5,226,006 | 7/1993 | Wang et al. | 365/189.01 |

OTHER PUBLICATIONS

Intel, *Memory Products 1991*, pp. 6–1 –6–420.
Research Disclosure 31982, *Undating Vital Products Data Information* in Flash Eprom Without Erasing.

*Primary Examiner*—David L. Robertson
*Attorney, Agent, or Firm*—Jeffrey L. LaBau; Bruce D. Johse; Joseph P. Abate

[57] ABSTRACT

A programmable firmware store for a personal computer system includes a plurality of nonvolatile alterable electronic memories connected in a mutually paralleled circuit arrangement. The memories are connected to a controller that controls the memories to read firmware from and write firmware into the electronic memories, and to write-protect at least one of the memories. Any memory can be write-protected as initially selected by a user or technician of the system. The initial selection can be changed easily to write-protect another of the memories. The firmware in one memory includes code for checking the validity of firmware stored in another memory, and for selecting one or the other of the memories dependent upon a version code of the firmware. The controller also includes an update code for updating the firmware in a selected memory.

6 Claims, 18 Drawing Sheets

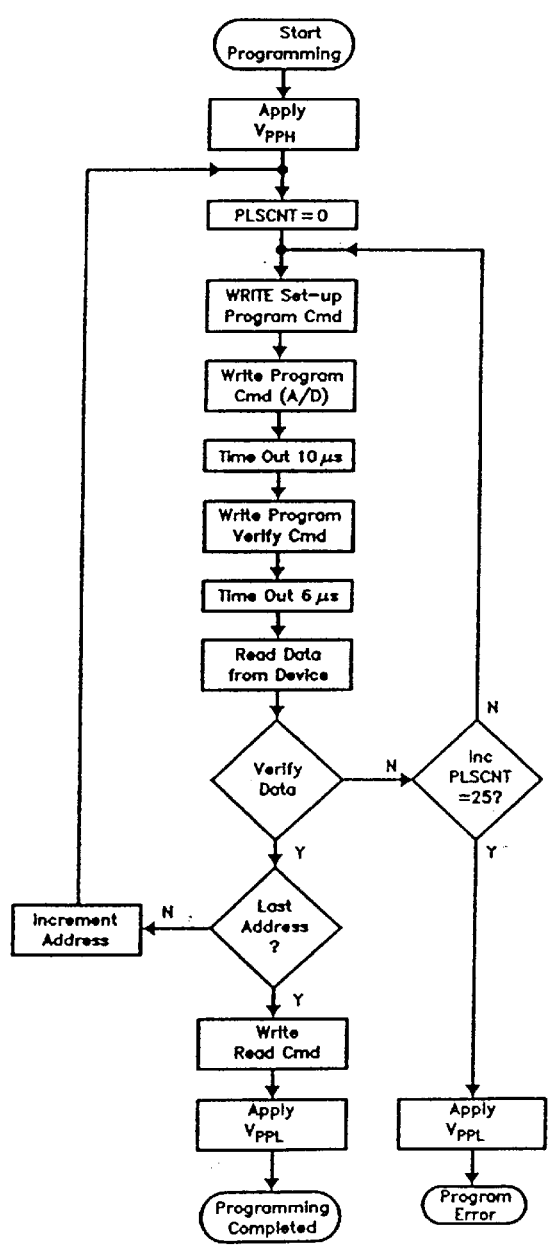

| Bus Operation | Command | Comments |
|---|---|---|
| Standby | | Wait for $V_{PP}$ Ramp to $V_{PPH}$ |
| | | Initialize Pulse-Count |
| Write | Set-up Program | Data = 40H |
| Write | Program | Valid Address/Data |
| Standby | | Duration of Program Operation ($t_{WHWH1}$) |
| Write | Program Verify | Data = C0H; Stops Program Operation |
| Standby | | $t_{WHGL}$ |
| Read | | Read Byte to Verify Programming |
| Standby | | Compare Data Output to Data Expected |
| Write | Read | Data = 00H, Resets the Register for Read Operations |
| Standby | | Wait for $V_{PP}$ Ramp to $V_{PPL}$ |

PRIOR ART

FIG. 10B

METHOD AND APPARATUS FOR PROVIDING UPDATED FIRMWARE IN A DATA PROCESSING SYSTEM

FIELD OF THE INVENTION

This invention relates to personal computer systems and, more particularly, to an arrangement for storing system firmware.

BACKGROUND OF THE INVENTION

Personal computer systems in general, and IBM personal computers in particular, have attained widespread use for providing computer power to many segments of today's society. A personal computer system can usually be defined as a desk top, floor standing, or portable computer that includes a system unit having a system processor, a display monitor, a keyboard, one or more diskette drives, a fixed disk storage, an optional pointing device such as a "mouse," and an optional printer. These systems are designed primarily to give independent computing power to a single user or small group of users and are inexpensively priced for purchase by individuals or businesses. Examples of such personal computer systems are sold under the trademarks: IBM's PERSONAL COMPUTER, PERSONAL COMPUTER XT, PERSONAL COMPUTER AT and IBM's PERSONAL SYSTEM/2 (hereinafter referred to as the IBM PC, XT, AT, and PS/2, respectively) Models 25, 30, 50, 55, 57, 60, 65, 70, 80, 90 and 95.

These systems can be classified into two general families. The first family, usually referred to as Family 1 Models, uses a bus architecture exemplified by the IBM AT computer and other "IBM compatible" machines. The second family, referred to as Family 2 Models, uses IBM's MICRO CHANNEL bus architecture (MCA) exemplified by IBM's PS/2 Models 50 through 95. The bus architectures used in Family 1 and Family 2 are well known in the art.

Beginning with the earliest personal computer system of the Family 1 models, the IBM PC, and through the Family 2 models the system processor was chosen from the Intel "86 Family" of processors (i.e., microprocessors). The Intel 86 Family of processors includes the 8088, 8086, 80286, 80386, and 80486 processors commercially available from Intel Corporation. The architecture of the Intel 86 Family of processors provides an upwardly compatible instruction set which assists in preserving software investments from previous processors in the 86 Family of processors. This upward compatibility preserves the software application base and is one of the major factors which contributed to the enormous success of the IBM PC and subsequent models.

The IBM PC and XT were the first models of the IBM personal computer line and used the Intel 8088 processor. The next significant change to IBM personal computer systems was the IBM AT which used the Intel 80286 processor. The PS/2 line spanned several of the Intel processors. A system similar to the PC and XT was a version of the PS/2 Model 30 which used an Intel 8086. The PS/2 Models 50 and 60 both used the Intel 80286 processor. The Intel 80386 processor is used in the IBM PS/2 Model 80 and certain versions of the IBM PS/2 Model 70. Other versions of the IBM PS/2 Model 70, as well as the PS/2 Models 90 XP 486 and 95 XP 486, used the Intel 80486 processor. One of the common points in all these systems is the use of an Intel 86 Family processor. A variety of commonly available and well known software operating systems, such as a DOS or an OS/2 operating system, can operate on various members of the Intel Family of processors.

The processors in the Intel 86 Family support a variety of "modes." The basic mode in the Intel 86 Family of processors is a "Real" mode. Real mode is the only operating mode of the 8088 and 8086 processors. Real mode supports a one megabyte address space. There are no protection mechanisms available in the 8088 and 8086 processors. The 80286 supports both a Real and a "Protected" mode of operation. As the name "Protected" implies, Protected mode provides a protected mode of operation. This protection prevents an application from interfering with the operation of other applications or the operating system. The 80286 provides extended addressing capabilities over the 8088 and 8086 by allowing up to sixteen megabytes of memory to be addressed directly. To maintain downward compatibility, the 80286 can be operated in Real mode to emulate the Real mode of the 8088 or 8086. The 80386 and 80486 extend the Intel 86 Family architecture even further by providing the ability to address up to four gigabytes of physical memory. The 80386 and 80486 also support a "Virtual 86" mode of operation. The Virtual 86 mode supports the operational characteristics of the Real mode within the overall confines of the Protected mode environment. This Virtual 86 mode is useful for providing a very high level of compatibility with applications which run under the DOS operating system but must now operate within an overall Protected mode operating system.

Beginning also with the earliest personal computer system of the Family 1 models, such as the IBM Personal Computer, it was recognized that a goal of achieving software-hardware compatibility would be of great importance. In order to achieve this goal, an insulation layer of system resident code, also referred to as "microcode," was established between the hardware and the software. This code provided an operational interface between a user's application program/operating system and the hardware device to relieve the user of the concern about the characteristics of hardware devices. Eventually, the code developed into a basic input/output system (BIOS), for allowing new devices to be added to the system, while insulating the application program from the peculiarities of the hardware. The importance of BIOS was immediately evident because it freed a device driver from depending on specific device hardware characteristics while providing the device driver with an intermediate interface to the device. Because BIOS was an integral part of the system and controlled the movement of data in and out of the system processor, it was resident on a system planar of the system unit and was shipped to the user in a read-only memory (ROM). For example, BIOS in the original IBM Personal Computer occupied 8K (a kilobyte or "K" refers to a quantity of 1024 bytes) of ROM resident on the planar board. In addition to the ROM, the planar board included the system processor, a main random access memory (RAM), and other components which were fixed in a substantially coplanar relationship on the board. The ROM also contained a power-on self test (POST) program which was used to test and initialize the computer system. The accumulation of code resident in the computer system ROM became known as the "system firmware," or simply "firmware." Thus, the firmware included a POST portion and a BIOS portion.

As new models of the personal computer family were introduced, the firmware had to be updated and expanded to support new hardware devices such as input/output (I/O) devices. As could be expected, the firmware started to increase in memory size. For example, with the introduction of the IBM PERSONAL COMPUTER AT, the firmware grew to require 32K bytes of ROM. With the introduction of the IBM PERSONAL SYSTEM/2 computer system with MICRO CHANNEL architecture, a significantly new BIOS, known as Advanced BIOS, or ABIOS, was developed. However, to maintain software compatibility, BIOS from the Family 1 models had to be included in the Family 2 models. The Family 1 BIOS became known as compatibility BIOS or CBIOS. Thus, BIOS evolved to include more than one type of BIOS such as the Compatibility Basic Input Output System (CBIOS) and the Advanced Basic Input Output System (ABIOS). Present architectural definitions for personal computer systems allow for up to 128K of system firmware address space.

Today, with the continuing development of new technology, personal computer systems are becoming even more sophisticated and are being enhanced more frequently. Because the technology is changing rapidly and new I/O devices are being added to the personal computer systems, implementing modifications and effecting extensions to the firmware have become significant problems in the development cycle of personal computer systems. In addition, maintenance of the firmware in computer systems which are installed at user locations is also a problem.

Sometimes, personal computer systems are linked to form a network (e.g., a Local Area Network) so that users can exchange information, share I/O devices, and utilize a particular direct access storage device (DASD) such as a particular fixed disk storage. Typically, the LAN includes "Clients" and a "Server." A Client includes a computer system having usually no DASD other than possibly a diskette drive. A Server is a computer system which includes a DASD for supplying the storage for the Clients of the local area network. Clients may require modifications, updates, extensions or maintenance of the firmware.

As a result of these problems and requirements, and of a desire to modify the firmware as late as possible in the development cycle, it has become necessary to provide the ability to modify the firmware with a minimal disruption to the operation of the personal computer system. Because marketability and consumer acceptance of personal computer systems appear to require the ability to add new I/O devices and to minimize cost, it should be appreciated that an easy modification of the firmware is a substantial factor in achieving success in marketing personal computer systems. Personal computer systems have traditionally stored at least a part of the system firmware in ROM. See, for example, commonly owned U.S. patent application Ser. No. 07/398,865, entitled "Initial BIOS Load for a Personal Computer System," which is hereby incorporated by reference. The major drawback of ROM is that once the ROM is manufactured its contents cannot be altered. For example, if the POST program code must be changed, the ROM must be physically changed. The ROM has traditionally been socketed to allow for the ROM to be replaced. However, changing the ROM in the field (i.e., at a customer location) is time consuming and, thus, costly.

It is known to replace the ROM with an electrically erasable and reprogrammable (i.e., alterable) nonvolatile random access memory (e.g., Flash memory), and to store POST and/or BIOS therein. See, for example, the publication from Intel Corporation, entitled *Memory Products* 1991, Intel Order No. 210830, ISBN 1-55512-117-9, and particularly Chapter 6 (*Flash Memories*, pgs. 6-1 through 6-420), which chapter is hereby incorporated by reference. This permits the firmware to be modified easily.

However, the present inventors believe that there exists a need to ensure the integrity of system firmware efficiently while permitting the system firmware to be modified easily.

SUMMARY OF THE INVENTION

A principal object of the present invention is ensuring the integrity of system firmware efficiently while allowing the firmware to be modified easily.

A further object of the present invention is modifying the firmware in a personal computer system while ensuring that such system retains sufficient firmware to remain operable.

The present invention has been developed for overcoming the above-mentioned needs, requirements and problems. In accordance with the invention, an apparatus for storing firmware includes: a plurality of nonvolatile alterable electronic memory devices being connected in an electrically mutually parallel circuit arrangement, and means for controlling the memory devices such that firmware can be read from or written to a selected one of the memory devices, the controlling means being electrically connected to the memory devices. Each memory device can include the same or a different version of the firmware. The redundant memories of this invention permits ensuring firmware integrity by write protecting one of the memory devices.

BRIEF DESCRIPTION OF THE DRAWINGS

Further and still other objects of the present invention will become more readily apparent in light of the following description taken in conjunction with the accompanying drawing, in which:

FIG. 10A and FIG. 10B are flow diagrams for erasing and programming Intel 28F010 Flash memories.

DETAILED DESCRIPTION OF A PREFERRED EMBODIMENT

The following detailed description is of the best presently contemplated mode for carrying out the present invention. This description is not to be taken in a limiting sense, but is made for the purpose of illustrating the general principles of the invention.

Figure 1A:
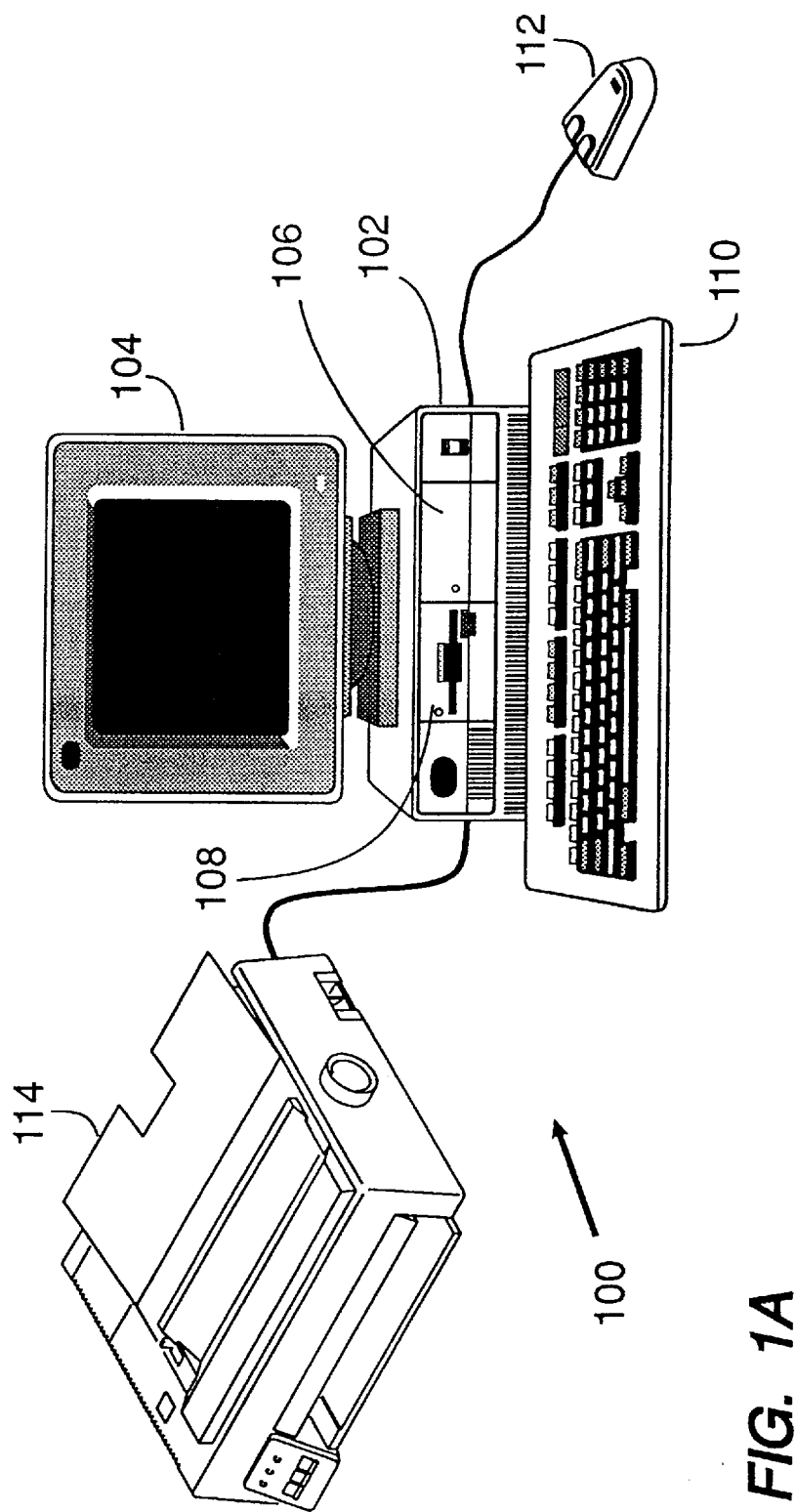
FIG. 1A is a drawing of a typical personal computer system.

Referring now to the figures, and in particular to FIG. 1A, there is shown a personal computer system 100 which employs the present invention. The personal computer system 100 comprises a system unit 102, output device or monitor 104 (such as a conventional video display), input devices such as a keyboard 110, an optional mouse 112, and an optional output device such as a printer 114. Finally, the system unit 102 may include one or more mass storage devices such as a diskette drive 108 and a hard disk drive (hardfile) 106.

Figure 1B:
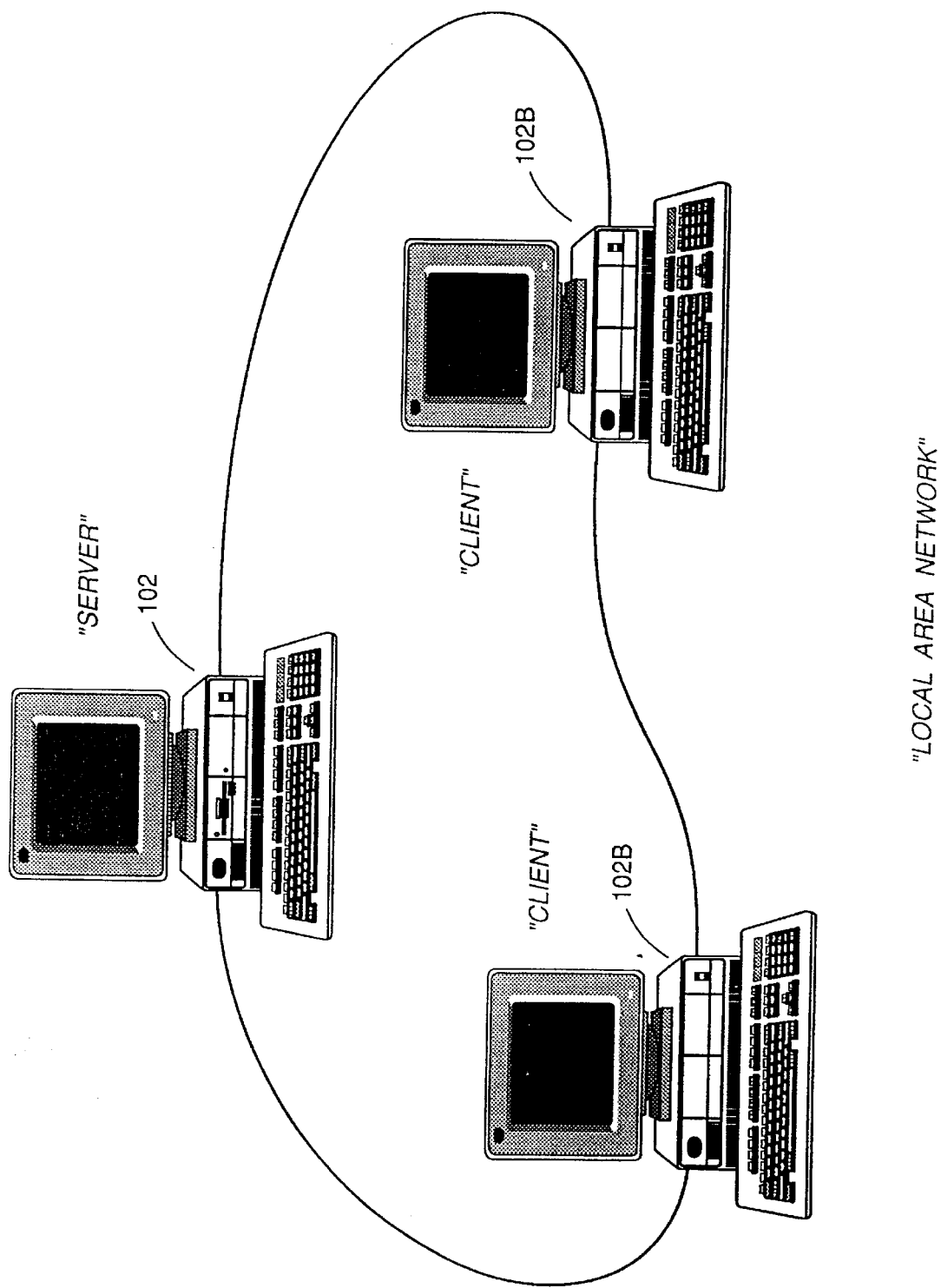
FIG. 1B is a diagram of a typical local area network.

The system unit 102 responds to the input devices. Optionally, the unit 102 and selected input and output devices 106, 108, 110, 104 may be connected in a well-known manner with other system units 102B to form a local area network (LAN) as shown in FIG. 1B. Typically, such units (Clients) 102B include no drives 106, 108. Of course, those skilled in the art are aware that other conventional I/O devices can also be connected to the system units 102, 102B for interaction therewith.

In normal use, the personal computer system 100 is designed to give independent computing power to a small group of users as a server in a LAN or to a single user, and is inexpensively priced for purchase by individuals or small businesses. In operation, a processor 202 (FIGS. 2 and 4) functions under an operating system such as IBM's OS/2 operating system or a DOS operating system. The operating system is loaded and stored within the system unit 102 in any conventional manner. This type of operating system utilizes a BIOS interface between the I/O devices and the operating system. BIOS, which is a part of the firmware, is divided into optional modules by function (see FIG. 9). BIOS provides an interface between the hardware and the operating system software to enable a programmer or user to program his machine without an in-depth operating knowledge of a particular device. For example, a BIOS diskette module permits a programmer to program the diskette drive without an in-depth knowledge of the diskette drive hardware. Thus, a number of diskette drives designed and manufactured by different companies can be used within the system 100. This not only lowers the cost of the system, but also permits a user to choose from a number of diskette drives. BIOS is more clearly defined in the *IBM Personal System/2 and Personal Computer BIOS Interface Technical Reference* 1988, which is incorporated by reference herein.

Unified Planar

Figure 2:
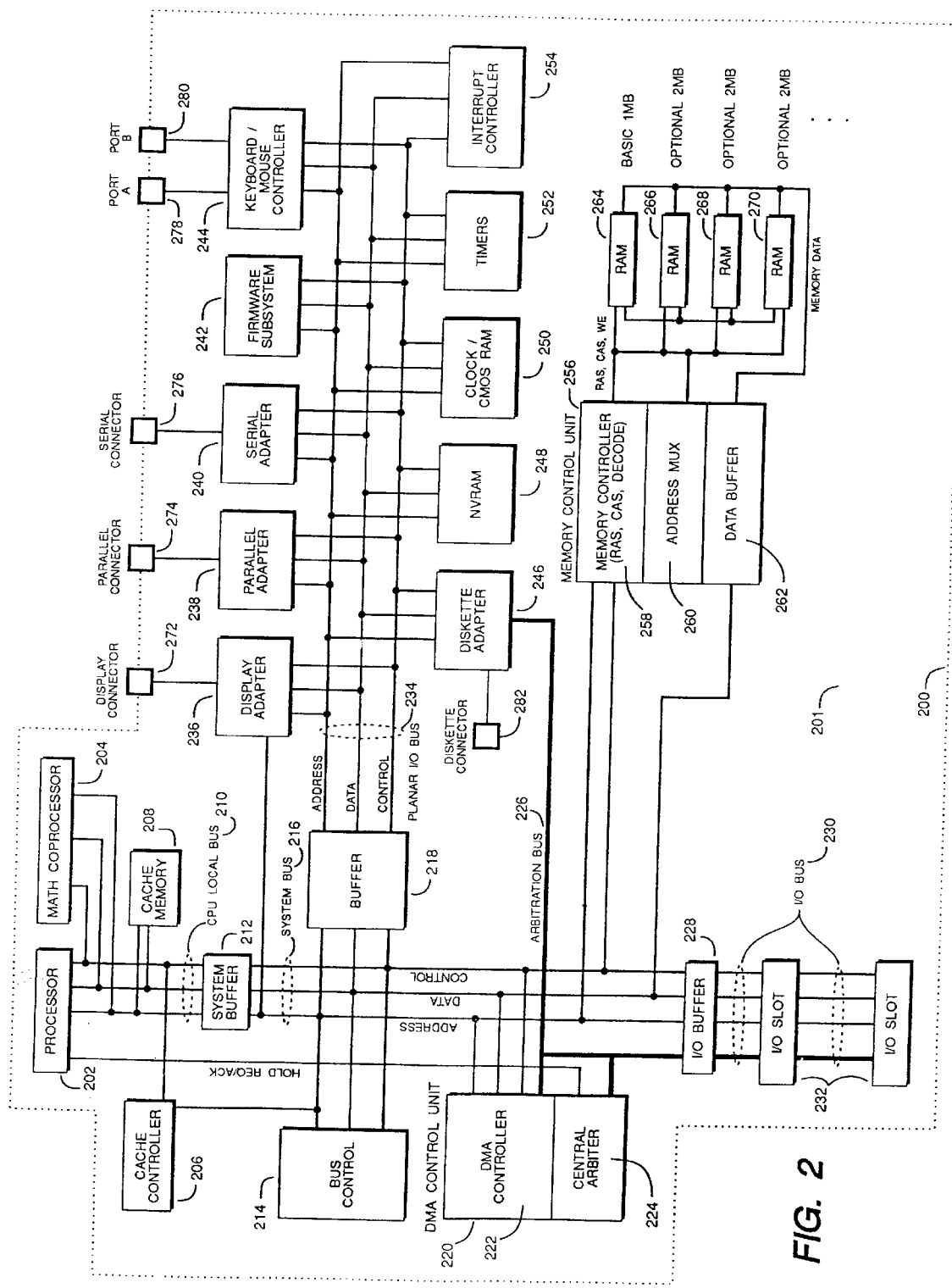
FIG. 2 is a block schematic diagram of a planar board which can be used in the computer system of FIG. 1A.

Referring to FIG. 2, there is shown a block diagram of a unified planar 200 of the system unit 102. The planar 200 includes a printed circuit board (PCB) 201 upon which are mounted or connected a number of input/output bus connectors 232 having I/O slots, a processor 202 which is connected by a high speed CPU local bus 210 under control of a bus control unit 214 to a memory control unit 256 which is further connected to a volatile random access memory (RAM) 264. Any appropriate processor 202 can be used such as an Intel 80386, Intel 80486 or the like.

The CPU local bus 210 (comprising address, data and control components) provides for the connection of the processor 202, an optional math coprocessor 204, an optional cache controller 206, and an optional cache memory 208. Also coupled onto the CPU local bus 210 is a system buffer 212. The system buffer 212 is itself connected to a slower speed (compared to the CPU local bus 210) system bus 216 which comprises address, data and control components. The system bus 216 extends between the system buffer 212 and an I/O buffer 228. The system bus 216 is further connected to the bus control unit 214 and to a direct memory access (DMA) control unit 220. The DMA control unit 220 includes a central arbitration unit 224 and a DMA controller 222. The I/O buffer 228 provides an interface between the system bus 216 and an I/O bus 230. Those skilled in the art will recognize that while the preferred embodiment is implemented on the MICRO CHANNEL bus of an IBM PS/2 computer system, which is well known in the art, alternative bus architectures could also be used to employ the invention.

Connected to the I/O bus 230 is a plurality of I/O bus connectors having slots 232 for receiving adapter cards (not shown) which may be further connected to I/O devices or memory (e.g., hardfile 106). Two I/O connectors 232 are shown for convenience, but additional I/O connectors may easily be added to suit the needs of a particular system. An arbitration control bus 226 couples the DMA controller 222 and the central arbitration unit 224 to the I/O connectors 232 and a diskette adapter 246. Also connected to the system bus 216 is a memory control unit 256 which includes a memory controller 258, an address multiplexer 260, and a data buffer 262. The memory control unit 256 is further connected to a main memory such as a random access memory as represented by the RAM module 264. The memory controller 258 includes the logic for mapping addresses to and from the processor 202 to and from particular areas of RAM 264. While the system 100 is shown with a basic one megabyte RAM module 264, it is understood that additional memory can be interconnected as represented in FIG. 2 by the optional memory modules 266, 268, 270.

A buffer 218 is coupled between the system bus 216 and a planar I/O bus 234. The planar I/O bus 234 includes address, data, and control components. Coupled along the planar I/O bus 234 are a variety of I/O adapters and other peripheral components such as the display adapter 236 (which is used to drive the optional display 104), a clock 250, a nonvolatile RAM 248 (hereinafter referred to as NVRAM), a serial adapter 240 (other common terms used for "serial" are "asynchronous" and "RS232"), a parallel adapter 238, a plurality of timers 252, the diskette adapter 246, a keyboard/mouse controller 244, an interrupt controller 254, and a firmware subsystem 242 which is essential to the present invention. According to the present invention, the subsystem 242 includes a plurality (e.g., two) of non-volatile alterable electronic memory devices which are connected in an electrically mutually parallel circuit arrangement. Each memory device includes the POST and the BIOS programs. POST includes a Bank Check and Select portion of the invention. The firmware subsystem 242 and the remaining essential elements of the invention will be described later with respect to FIGS. 5A, 5B, 5C, 6, 7, 8, 9, 10A, 10B, 10C, 11A, 11B and 11C.

The clock 250 is used for time of day calculations. The NVRAM 248 is used to store system configuration data. That is, the NVRAM 248 will contain values which describe the present configuration of the system. The NVRAM 248 contains information which describes, for example, adapter card initialization data, capacity of a fixed disk or a diskette, the amount of memory, etc. Furthermore, these data are stored in NVRAM 248 whenever a configuration program is executed. This configuration program can be a conventional Set configuration program provided on a system Reference Diskette included with IBM PS/2 computer systems. The Reference Diskette is sometimes referred to as a diagnostic, maintenance or a service diskette. The purpose of the configuration program is to store values characterizing the configuration of this system to NVRAM 248 which are saved when power is removed from the system. The NVRAM can be a low power CMOS memory with a battery backup.

Connected to the keyboard/mouse controller 244 are a port A 278 and a port B 280. These ports are used to connect the keyboard 110 and the mouse 112 to the personal computer system 100. Coupled to the serial adapter unit 240 is a serial connector 276. An optional device such as a modem (not shown) can be coupled to the system through this connector 276. Coupled to the parallel adapter 238 is a parallel connector 274 to which a device such as the printer 114 can be connected. Connected to the diskette adapter 246 is a diskette connector 282 used to attach one or more diskette drives 108.

Planar Board

Figure 3:
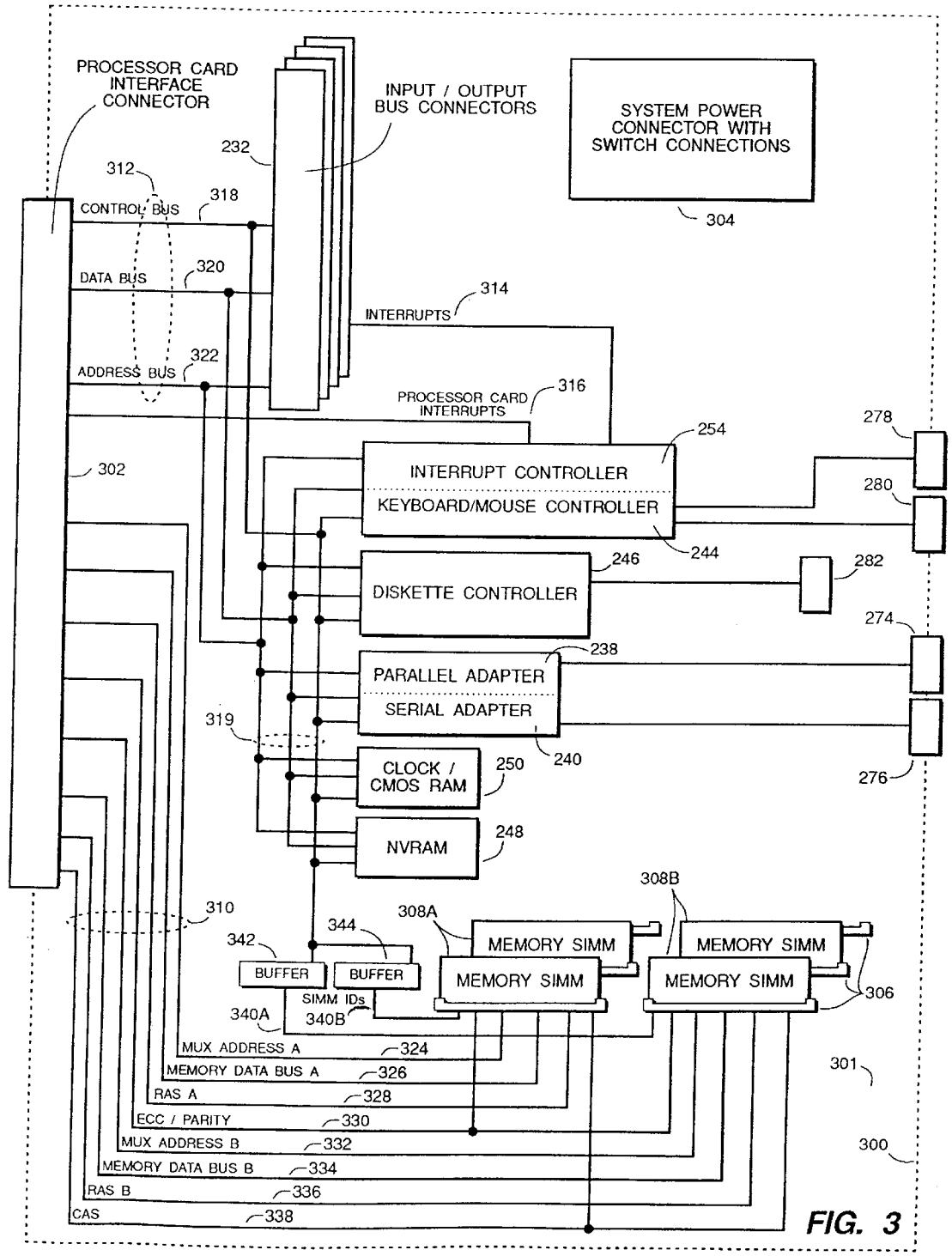
FIG. 3 is a block schematic of an alternative planar board which can be used in the computer system of FIG. 1A.
Figure 4:
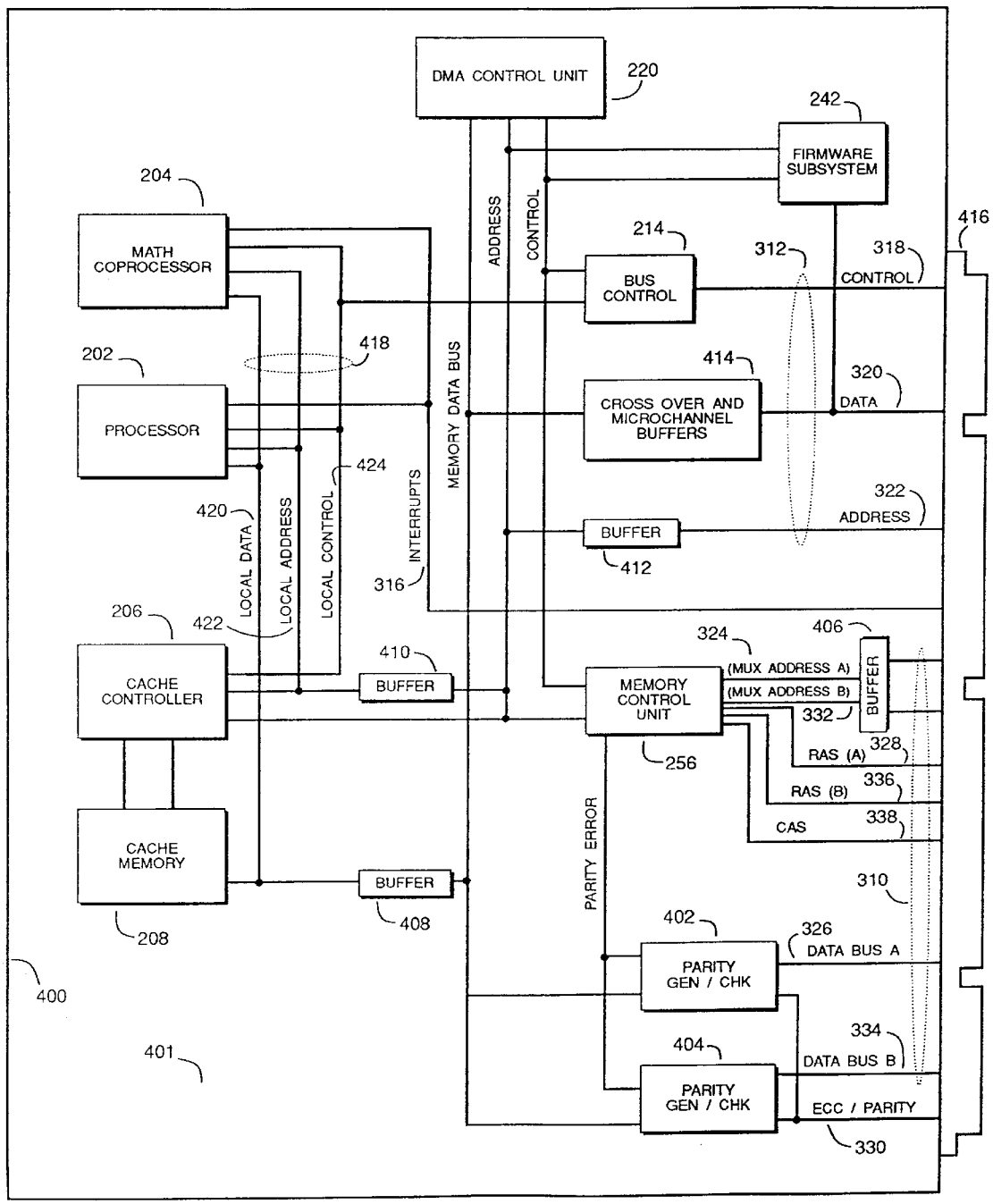
FIG. 4 is a block schematic of a processor card which can be used with the alternative planar board of FIG. 3.

According to an alternative embodiment of the personal computer system 100, the unified planar 200 is replaced by a planar board 300 and a processor card 400 (FIGS. 3 and 4). The processor card 400 is removably mounted on and is electrically connected to the planar board 300. Like element numbers of FIG. 2 correspond to like elements in FIGS. 3 and 4. Referring now to FIG. 3, the planar board 300 comprises a printed circuit board (PCB) 301 upon which are mounted (e.g., surface mounted) various components that are interconnected by wiring or circuits in the PCB. Such components include a suitable commercially available electrical connector 302 into which an edge 416 of the processor card 400 is plugged for removably mounting and electrically connecting the processor card 400 to the planar board 300. A plurality of single in-line memory module (SIMM) connectors 306 is also mounted on PCB 301 for connecting to memory banks 308A, 308B forming the system main memory or RAM. One or more I/O bus or expansion connectors 232 are also mounted on PCB 301 for connection to different expansion adapters and options that might be added or incorporated into the personal computer system 100. For example, the fixed disk drive 106 may be connected to an adapter card (not shown) having a disk controller which is connected to a connector 232. Preferably, each connector 232 is a commercially available connector of the type conforming to the above-mentioned MICRO CHANNEL architecture.

Also mounted on planar board 300 are an interrupt controller 254 and a keyboard and mouse controller 244, connected to keyboard and mouse connectors 278, 280, a diskette controller 246 connected to a diskette connector 282, and serial and parallel adapters 240, 283 connected to serial and parallel connectors 276, 274, which allow the various I/O devices to be connected into the system. A system power connector 304 is mounted on PCB 301 for connection to a power unit (not shown) that supplies the necessary power for the system. A nonvolatile memory (NVRAM) 248 and a time-of-day clock 250 are also mounted on PCB 301. The PCB 301 also has mounted thereon various oscillators (not shown) to provide timing signals, and buffers 342, 344 (not all shown) to isolate sections of the circuitry in a manner well known.

The wiring of PCB 301 interconnects the various components as shown in the drawing and is grouped into three groupings, a memory bus 310 (including lines 324–338), a channel bus 312 (including address bus 322, data bus 320 and control bus 318), and miscellaneous signal lines including interrupt lines 314, 316, all of which are connected to counterpart wiring on PCB 401 through the connectors 302, 416. Tapped off the bus 312 is a planar function bus 319.

Processor Card

Referring to FIG. 4, there is shown the processor card 400 for being removably mounting on the planar board 300. The processor card 400 comprises a printed circuit board (PCB) 401 having mounted (e.g., surface mounted) thereon a plurality of commercially available components including a processor 202, an optional math coprocessor 204, an optional cache controller 206, an optional cache memory 208, a direct memory access (DMA) control unit 220, a bus control unit 214, a memory control unit 256, a firmware subsystem 242 of the present invention, and parity checking units 402, 404. The processor 202 preferably is a high performance type, such as an Intel 80486, having thirty-two bit data paths and providing thirty-two bit addressing capability. Of course, Intel 80386DX, 80386 and the like processors can be used. The remaining components are selected in conventional fashion for their compatibility with such processor. A plurality of buffers 406, 408, 410, 412, 414 is connected as shown. The buffers provide selective isolation or connection between the circuits allowing different portions to be used concurrently, for example, to move data between the processor and cache while other data is being transferred between an I/O unit and the main memory 308A, 308B. All of the above components are electrically connected to each other as appropriate by printed wiring circuits in PCB 401 which terminate at the edge connector 416. The edge connector 416 is pluggable into edge connector 302 on the planar board 300 shown in FIG. 3 so that the planar board 300 and the processor card 400 are electrically and mechanically interconnectable.

The wiring circuits of PCB 401 include a local bus 418 including data, address and control lines 420, 422, 424, respectively, which interconnect the processor 202 with an optional math coprocessor 204, an optional cache controller 206 and an optional cache memory 208, as shown in FIG. 4. The remaining circuit lines generally include interrupt lines 316, channel bus lines 312 and memory bus lines 310. The channel bus lines 312 include control, data and address bus lines 318, 320, 322, respectively. Memory bus lines 310 include multiplexed memory address lines 324, 332, row address strobe (RAS) lines 328, 336 for memory banks 308A, 308B, column address strobe (CAS) line 338, data bus A and B lines 326 and 334, and a line 330 for use in error checking via parity check or ECC checking. For simplicity, certain miscellaneous lines, such as reset, grounds, power-on, etc. have been omitted from FIGS. 2, 3 and 4.

During normal operation of a personal computer system 100 having a board 300 and a card 400, the card 400 is electrically and mechanically connected to board 300 and typically lies in a plane oriented substantially perpendicularly to the board 400.

Firmware Subsystem

The system firmware includes the Power-On Self Test program (POST) and the Basic Input Output System program (BIOS). POST is the set of instructions which execute when the system is first powered-on. The execution of POST is critical to the initialization of the personal computer system. Without POST, the system would be unable to load an operating system or other programs (e.g., an update utility program). BIOS is the set of instructions which facilitates the transfer of data and control instructions between the processor and I/O devices.

Figure 5A:
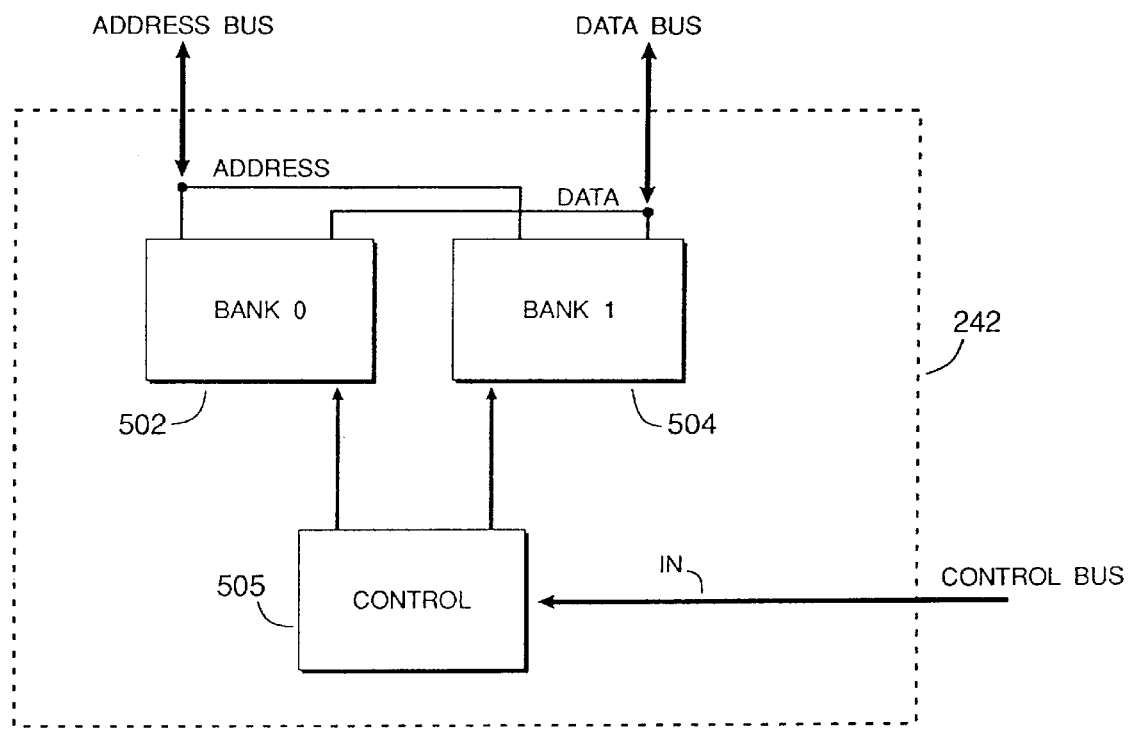
FIG. 5A is a block schematic of the apparatus according to the present invention.
Figure 7:
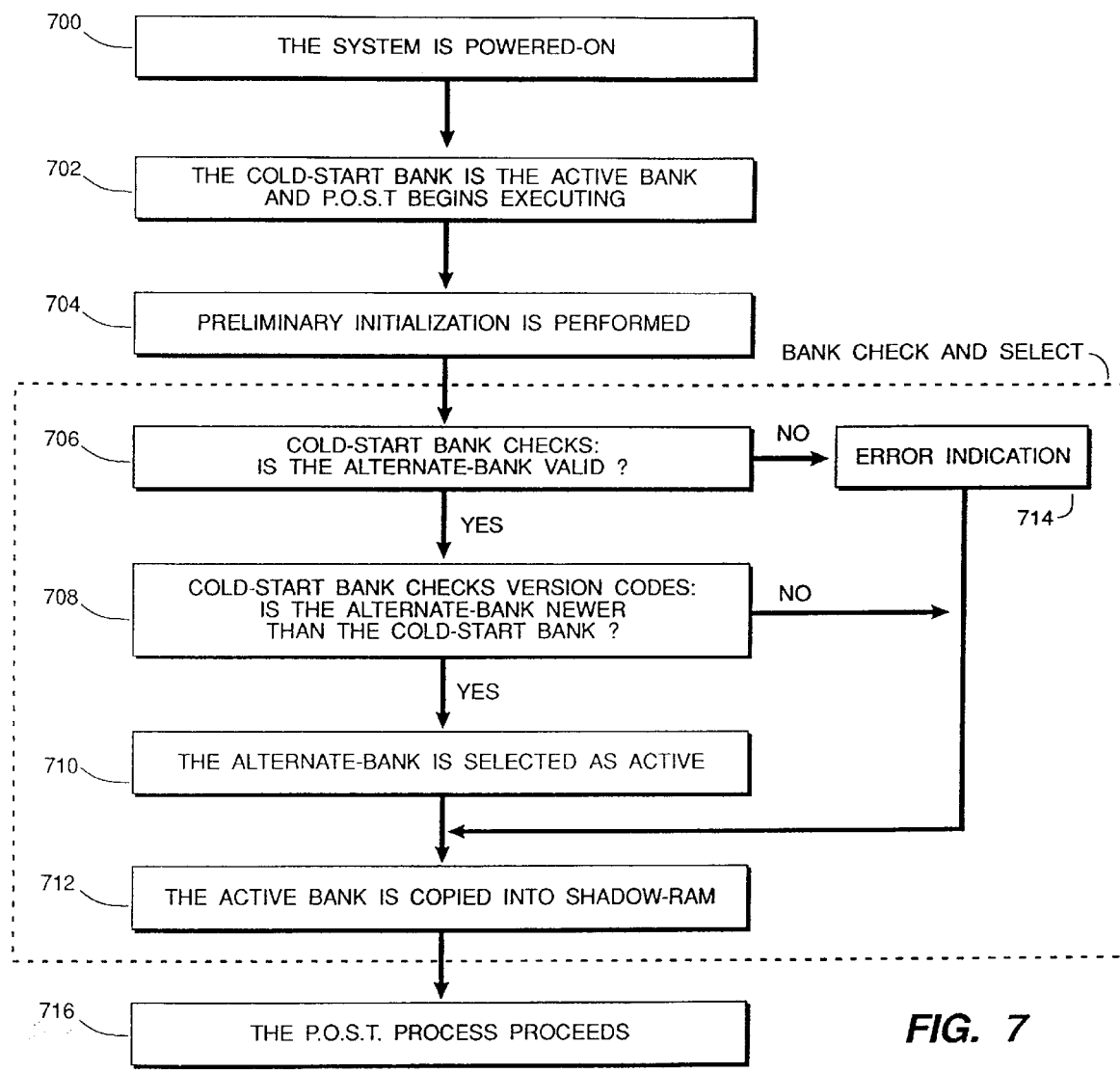
FIG. 7 is a flow diagram of the power-on sequence as it applies to the firmware subsystem.

Referring now to FIG. 5A, there is shown a block diagram of the firmware subsystem 242 according to the present invention. Two memory banks 502, 504 are shown managed by a control apparatus 505 which controls the reading and writing of the firmware from and into the memory banks 502, 504. The banks 502, 504 are connected in an electrically mutually parallel circuit arrangement, and are also connected to the control apparatus 505, all as shown in FIG. 5A. The control apparatus always write protects a selected one of the banks 502, 504. Preferably, complete firmware (i.e., POST and BIOS necessary for operation of the computer system) is stored within each of the banks 502, 504. POST includes a portion of code according to the invention. Such portion performs a Bank Check and Select routine as shown in FIG. 7, steps 706–714. Bank Update code, which is part of a firmware update utility program (FIG. 8), is resident initially, e.g., on a diskette. Such Update code causes the reprogramming of a selected memory bank 502, 504 with updated firmware. The control apparatus, thus, operates responsive to signals originated at least by the Bank Check and Select code and/or the Bank Update code.

Figure 5B:
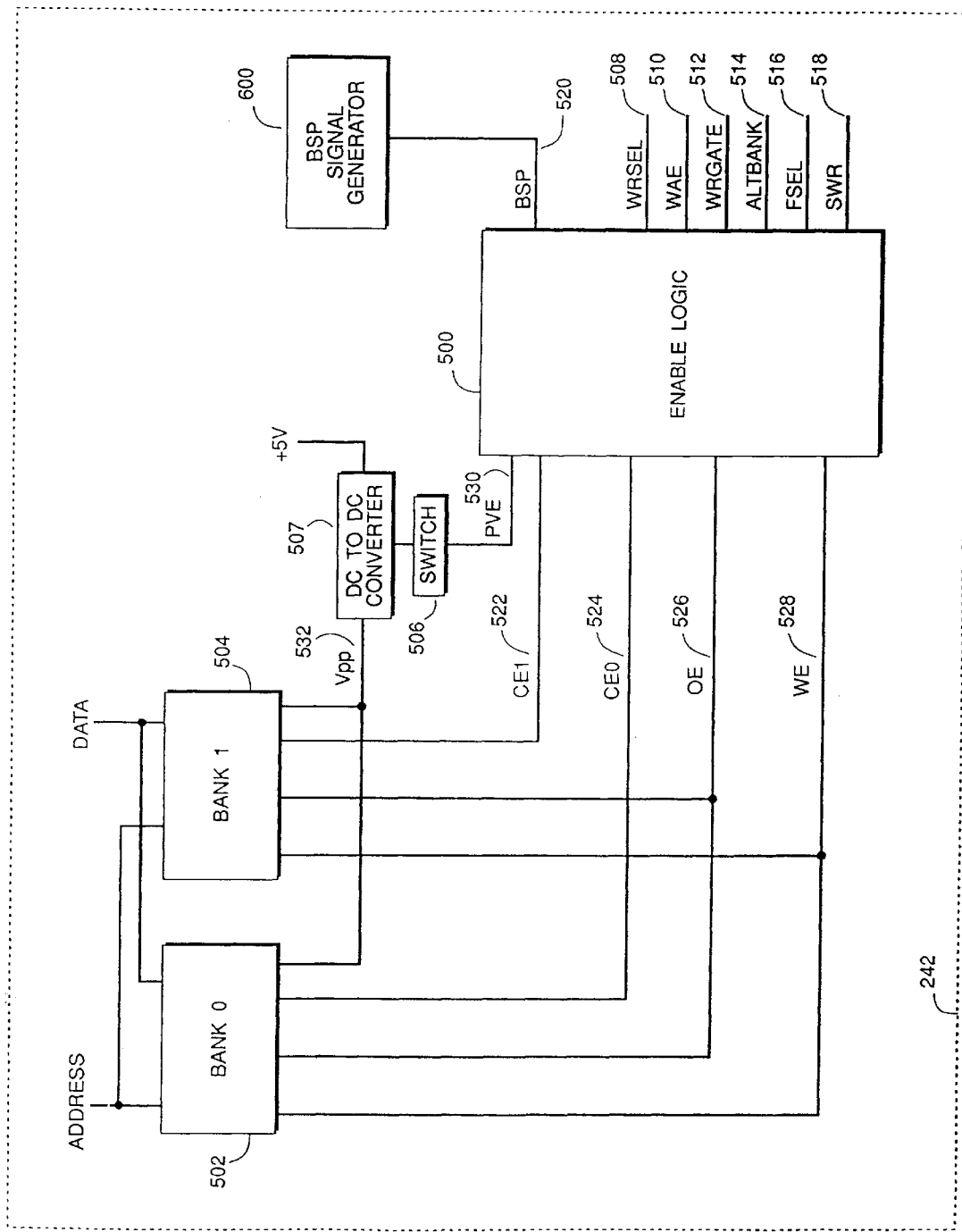
FIG. 5B is a more detailed block schematic diagram of the memory devices and the control means of FIG. 5A.

FIG. 5B shows the firmware subsystem 242 in more detail. The subsystem 242 includes a plurality (e.g., two) of in-circuit reprogrammable (i.e., alterable) nonvolatile memory devices, bank 0 502 and bank 1 504. The memory devices or banks 502, 504 are of the semiconductor type such as the Intel 28F010 Flash Memory device described in *Intel Memory Products* 1991, pages 6-55 through 6-80 which is incorporated herein by reference. The Intel 28F010 Flash Memory provides 128 kilobytes of data storage capacity. The apparatus 505 of FIG. 5A includes enable logic device 500 having input lines 508–520 and output lines 522–530, voltage generator 507, 506 and various generators of the signals (WRSEL, WAE, WRGATE, ALTBANK, FSEL, SWR, BSP) on the input lines 508–520. The input signals originate in the Bank Check and Select code, the Bank Update code, the generator 600 and/or in various hardware, all as is well understood by those skilled in view of the instant specification. The device 500 is, for example, a logic device "PAL16R8D" commercially manufactured by Advanced Micro Devices, Inc. (AMD). Either bank 0 502 or bank 1 504 may be active at any given time. The enable logic of the device 500 determines which bank is to be active (active bank). A switch 506 is included to control a DC to DC converter 507 (converting +5 V to +12 V) which provides a programming voltage Vpp on a line 532 to the banks 502, 504. The switch 506 is, for example, a transistor device "2N3904" commercially manufactured by Motorola, Inc. The DC to DC converter 507 is, for example, a device "NMF0512S" commercially manufactured by International Power Sources, Inc. The memory banks 502, 504 are connected to address and data lines (FIGS. 2 and 4) and the lines 508–518 are connected to the control lines in a manner well within the skill of the art. The parallel banks 502, 504 can be permanently affixed to the PCB 201, 401 board because they can be reprogrammed in-place, unlike a ROM of previous computer systems which was socketed.

It should be noted that a subsystem which employed only a single memory bank of Intel 28F010 Flash Memory would be vulnerable to incapacitation. Because of its construction, a Flash memory device must first be completely erased before it can be reprogrammed. If there is a power loss to the computer system during the time period in which the Flash memory is being erased or before it can be completely reprogrammed, then the critical initialization program (POST) is likely to be lost. Without POST, the system could not "boot" and, thus, could not load and run an update program which would update the firmware in the single memory bank.

Continuing to refer to FIG. 5B, a more detailed description of the enable logic device 500 is presented. The enable logic device 500 has as an input a Write Select bit or signal (WRSEL) which is a bit obtained from an I/O control port used to enable writes to the selected bank 502 or 504. The control port used to provide the WRSEL signal can be a standard I/O port resident in the Memory Control Unit 256 of FIGS. 2 and 4. A control port is accessed through an "OUT" instruction of the Intel 86 Family of processors which is well known in the art. When WRSEL on line 508 is a logical zero, writes are enabled. This WRSEL bit is under direct program control. Direct program control is understood to be a control by the Bank Update code of the utility program (see FIG. 8).

Figure 5C:
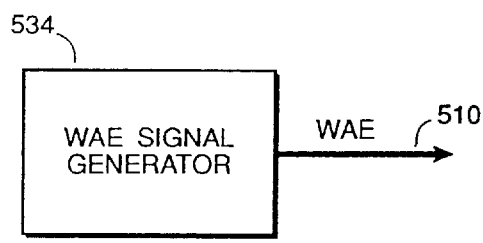
FIG. 5C is a block diagram of a generator for generating a Write Authority Enable (WAE) signal.

The Write Authority Enable (WAE) bit (signal) on line 510 is a security feature which allows bank reprogramming to be prevented. For example, the control apparatus 505 may include a signal generator 534 (FIG. 5C). The generator 534 consists of, e.g., a three position key switch and a source of suitable potential (not shown). One position of this switch is the OFF or disabled position. The second position of the switch is ON, but no maintenance authority. The third position is ON with maintenance authority. Maintenance authority can be considered to be equivalent to a "service mode" of operation. That is, a mode in which only a qualified computer service technician is allowed to perform certain tasks. The signal WAE would only be enabled (e.g., logical 1) by the switch when the switch is in the ON with maintenance authority position. This would ensure that the casual user could not alter the contents of the firmware banks 502, 504. Of course, the WAE bit on the line 510 could be controlled in a number of ways and the switch is only one such example. The WAE signal could be controlled by other logic in the computer system which could include a programmable I/O port. In systems which do not wish to support this added level of security, this WAE signal is always in the enabled state.

Continuing now with discussion of the enable logic device 500, the Write Gate (WRGATE) bit on the line 512 is a hardware generated timing signal (active low) received from the Memory Control Unit 256 of FIGS. 2 and 4. WRGATE controls the pulse width of the Write Enable 528 (WE) signal on the line 528 to the firmware banks 502, 504 as set forth in the Intel 28F010 Flash device specification previously incorporated by reference. The Alternate-Bank bit (ALTBANK) on the line 514 selects the Alternate-Bank for reads or writes (logical 0=Alternate-Bank). The Alternate-Bank is the bank which is not initially selected by a BSP signal on the line 520. ALTBANK signal on line 514 is received from the Memory Control Unit 256 of FIGS. 2 and 4 and is under direct program control. The Bank Select and Protect (BSP) signal, described in more detail with reference to FIG. 6, determines which bank is to be active at power-on (logical 0=bank 0 502). The Firmware Select (FSEL) signal is active when any firmware address has been decoded during read or write cycles. FSEL 516 is received from hardware such as the Memory Control Unit 256 of FIGS. 2 and 4 and is active low. System Write/Read 518 (SWR) signal, a hardware generated timing signal, is high for a system write cycle, low for a read cycle. SWR 518 is received from hardware such as Memory Control Unit 256 of FIGS. 2 and 4. The signals WRGATE 512, FSEL 516, and SWR 518 are hardware generated timing and control signals which are well understood in the art.

A Programming Voltage Enable (PVE) output signal on the line 530 of the enable logic device 500 controls the operation of the switch 506. When PVE 530 enables the switch 506, the DC to DC converter 507 is enabled and provides a +12 V programming voltage Vpp on the line 532 to the banks 502, 504. The converter 507 is connected to a source of potential (+5 V) readily available within the unit 102. When PVE 530 disables the switch 506, successful writes to the banks 502, 504 cannot occur. The Intel 28F010 Flash memory device requires +12 V to enable the reprogrammable or alterable feature of the device.

The Chip Enable signals (CE1, CE0), the Output Enable signal (OE), and the Write Enable signal (WE) are input signals to the Intel 28F010 Flash memory device as known in the art and described in the above referenced Intel 28F010 specification previously incorporated herein. Chip Enable 0 524 (CE0) and Chip Enable 1 522 (CE1) determine which bank 502, 504 is active. The respective Chip Enable signal activates the respective device's control logic, input buffers, decoders and sense amplifiers which are included with the elements shown in FIG. 10C. Output Enable 526 (OE) is an input signal common to both the bank 0 502 and the bank 1 504 which enables the reading of the active bank. Output Enable (OE) activates the device's data output signals during a read cycle. Write Enable 528 (WE) is an input signal common to both the bank 0 502 and the bank 1 504 which determines if and when a data write will be accepted. Write Enable controls writes to the control register and the array of the active bank. Both of these signals (OE and WE) are gated internal to the Flash memories by the CE0 and CE1 signals. Thus, reads and writes can occur with respect to only the active bank.

The enable logic device 500 is defined by a set of equations hereinafter set forth for use in the programmable logic device or other physical implementation. In the notation which follows, the underscore "_" is purely notational for the reader and means that the signal is active low. The notation used on the right-hand side of the equation is: the "!" means logical NOT, the "&" means logical AND, the "#" means logical OR. The "!" when used on the left-hand side of the equation sign is used to mean active low. That is, when the right-hand side evaluates to be active, the signal on the left-hand side is to be active in the low state. The five equations for these signals are:

!PVE_=!WRSEL_& !WAE

!CE0_=!FSEL_& !BSP_& ALTBANK_# !FSEL_& BSP_& !ALTBANK_

!CE1_=!FSEL_& CE0_

!OE_=!FSEL_& !SWR_

!WE_=!FSEL_& SWR_& !ALTBANK_& !WRSEL_& !WAE & !WRGATE_

Although the above five equations completely describe the operation of the device 500, several example calculations may be instructive:

Example #1, a read operation directed to the power-on or (base bank):
With:
SWR=0, WRSEL=1, WAE=1, FSEL=1, BSP=0, ALTBANK=1
Then:
PVE=1, CE0=1, CE1=1, OE=1, WE=1
Then:
FSEL=0 to start the read operation.
Since SWR=0, a read will occur.
Then:
PVE=1, CE1=1, WE=1, CE0=0, OE=0

Data will then become valid until FSEL goes to 1.

Example #2, a write operation directed to the Alternate-Bank:
First:
SWR=0, BSP=0, WRSEL=1, WAE=1, FSEL=1, ALTBANK=0
Then:
PVE=1, CE0=1, CE1=1, OE=1, WE=1
Then:
WAE=0, WRSEL=0, Then: PVE=0
At this point, the system waits a specified period of time (delay).
Then:
The processor 202 initiates a write cycle of the desired data.
Then:
WRGATE=0, SWR=1, FSEL=0
Then:
CE0=1, WE=0, PVE=1, CE1=0, OE=1
At this point, the data is written until WRGATE goes to 1.

Figure 11A:
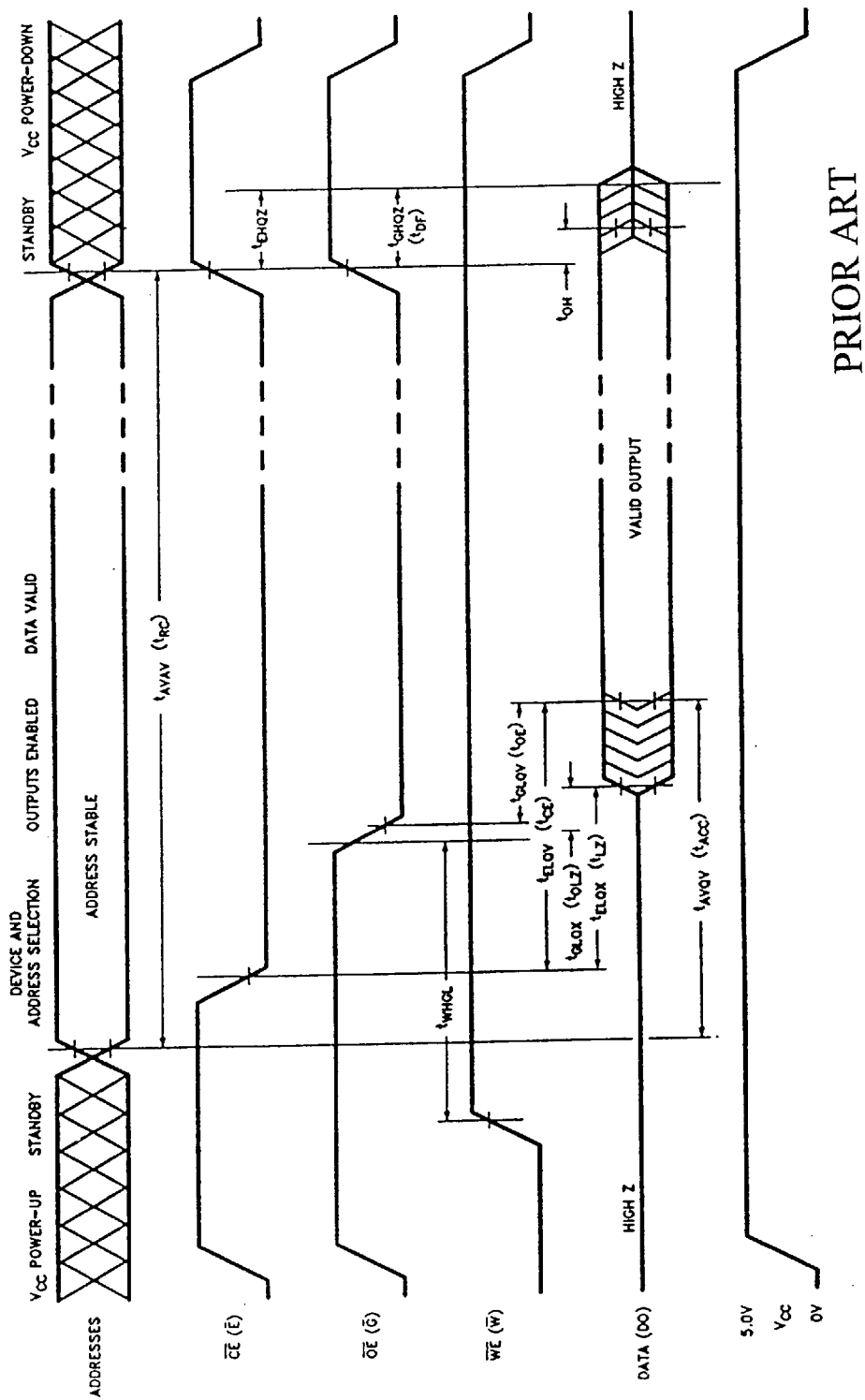
FIG. 11A, FIG. 11B, and FIG. 11C are diagrams of signal waveforms, respectively, for reading, erasing and programming operations of one Intel 28F010 Flash memory.
Figure 11B:
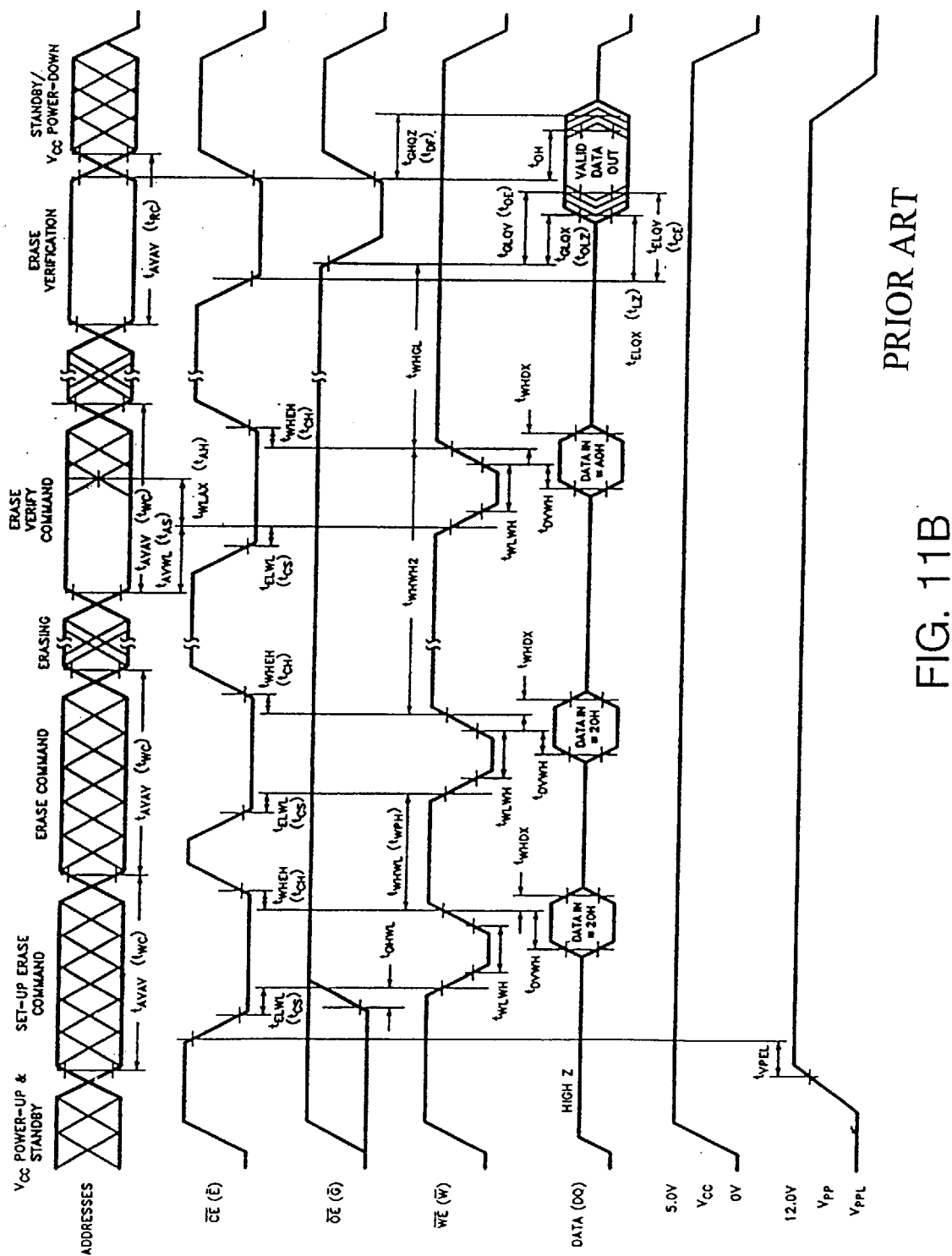
Figure 11C:
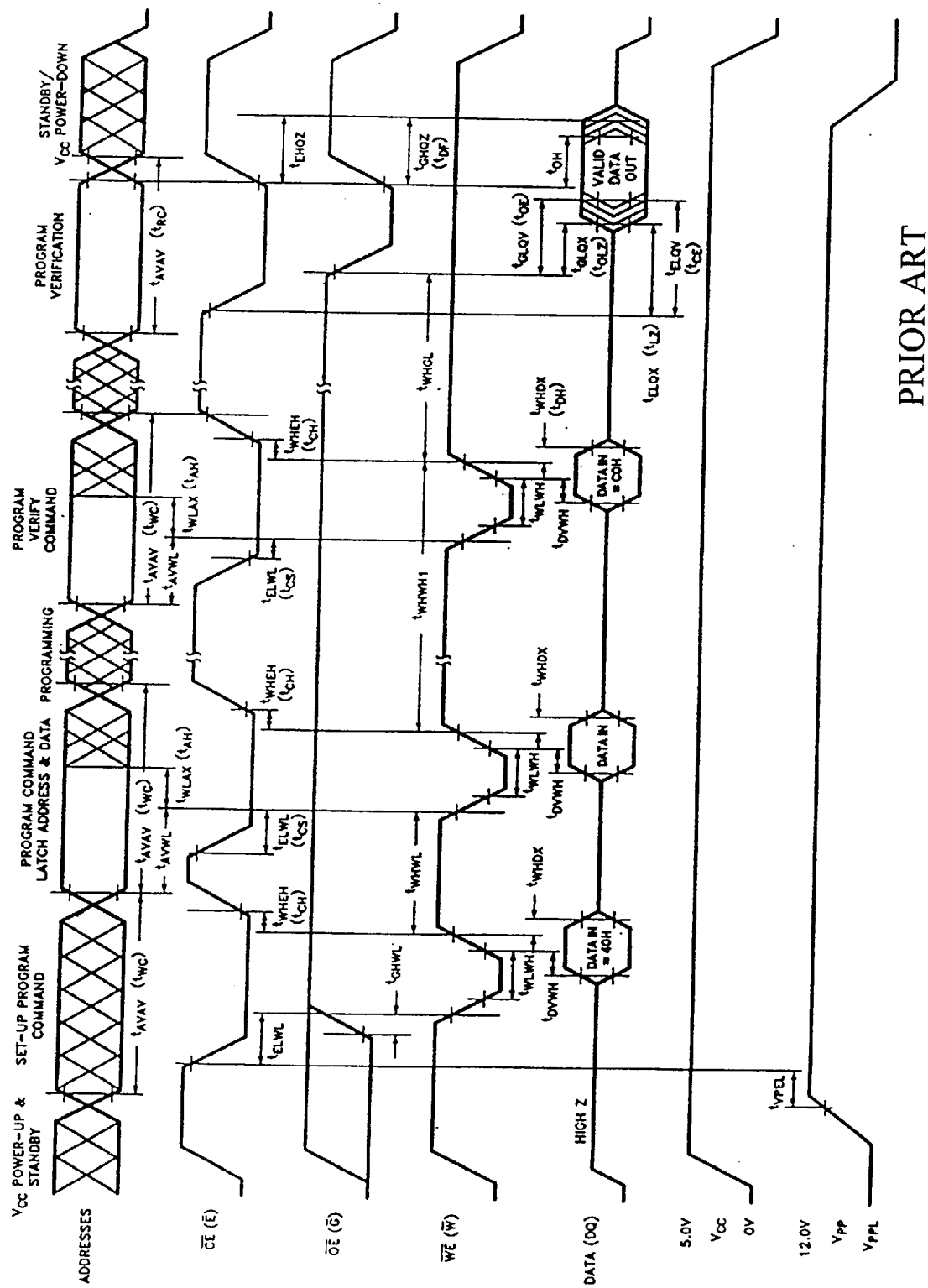

See FIGS. 11A, 11B, and 11C for graphs of waveforms for various signals used for reading from and writing to a Flash memory device 502, 504.

Referring again to FIG. 5B, the banks 502, 504 are not required to be physically separate parts. A part can be built which represents the logical functions of the two banks 502, 504 while being packaged as a single device. The parts can be repackaged for purposes which can include reduced cost and reduced board space.

Figure 6:
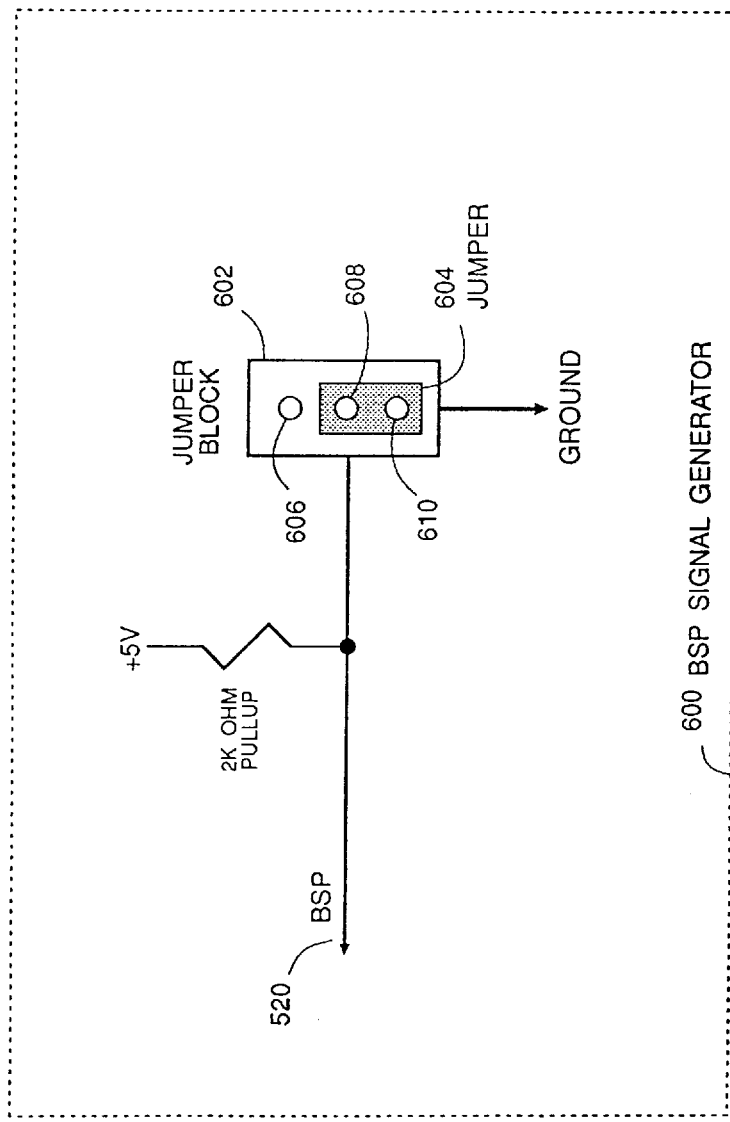
FIG. 6 is a block schematic diagram of an apparatus for generating a signal at the BSP input of an enable logic device of the control means.

Turning now to FIG. 6, there is shown a block schematic diagram of an apparatus (BSP Signal Generator) 600 for generating the Base Bank Select and Protect (BSP) signal. The generator 600 includes a jumper block 602 containing three electrically conductive pins 606, 608, and 610 or contact points for the attachment of a cold-start bank select jumper 604. The jumper 604 is used to connect electrically either pins 606 and 608 or pins 608 and 610. Pin 606 is a no-connect pin. The pin 608 is connected directly to the BSP output line or pin 520. The pin 610 is connected to electrical ground. When the jumper 604 connects pins 606 and 608, BSP 520 is pulled up to a logically high level representing the "set" or "logical 1" state. When jumper 604 connects pins 608 and 610, BSP 520 is pulled down to ground potential representing the "clear" or "logical 0" state. Thus, jumper 604 determines the initial state of the BSP 520 signal as either a logical "1" or a logical "0". Block 602 is any suitable insulator while the jumper 604 is any suitable electrical conductor.

Description of Operation

It is advantageous to discuss the operation of the computer system 100 while focusing on the operation of the firmware subsystem 242. Four cases will be discussed.

In a first case (#1), the computer system 100 includes two firmware memory banks 502, 504 each containing an identical complete program code image (i.e., identical firmware). This is a typical case at the time of computer system manufacture. In addition, the cold-start bank select jumper 604 is assumed to be in a position (shown in FIG. 6) which selects the bank 502 of the firmware subsystem 242. Referring now to the flowchart of FIG. 7 and again to FIG. 5B, the system 100 is powered-on, step 700. Only actions relevant to the operation of the firmware subsystem 242 need be discussed. Coding the relevant steps set forth in FIGS. 7, 8, 10A and 10B, and generating electrical signals (e.g., WRSEL 508, ALTBANK 514) responsive to such code are well within the skill of the art. The processor 202 begins fetching the POST code from a predetermined address in the bank 502, step 702. Because the firmware is mapped into this predetermined address space and because the bank 502 is selected to be active at power-on by the jumper 604, the processor 202 obtains the program code from the bank 502.

The POST portion of the code in the bank 502 performs some fundamental test and initialization activities such as checking the processor self-test status, step 704. The type and scope of these early tests are matters of well-known design choice. However, the step 704 also includes initializing a small section (64K) of system RAM 264 and an additional section (128K) of system RAM known as Shadow Memory (Shadow RAM). POST then copies a program code routine (Bank Check and Select code shown in FIGS. 7 and 9) which is a portion of POST into the 64K section. This code portion includes code to perform each of the steps 706–714. At this point, the Bank Check and Select code which is in the 64K section of system RAM then checks the bank 504 firmware for validity, step 706. The validity check 706 on the bank 504 can be a checksum procedure which must result in a predetermined value. For example, an eight-bit running sum of every byte in the firmware image can be computed and compared to zero, and if found to be zero the firmware image would be considered valid. Other forms of validity checks can include a cyclic redundancy check (CRC). The type of validity check or test, if one is used at all is a matter of well-known design choice. If bank 504 firmware is not valid, then an error is indicated to the user, step 714, and the system proceeds to step 712 where the firmware (POST and BIOS) image of the firmware stored within the presently active firmware bank 502 is copied into Shadow-RAM, step 712. Because accessing RAM is normally much faster than accessing the firmware subsystem, a significant improvement in the processing speed of the computer system is achieved. Use of Shadow-RAM is for performance reasons; POST and BIOS can be run exclusively from the Flash memory device 502 without any transfer of the image to Shadow-RAM. The transfer may be omitted to allow for alternate uses of the 128K of Shadow-RAM with the knowledge that a performance decrease in the operation of POST and BIOS is likely to occur.

Figure 9:
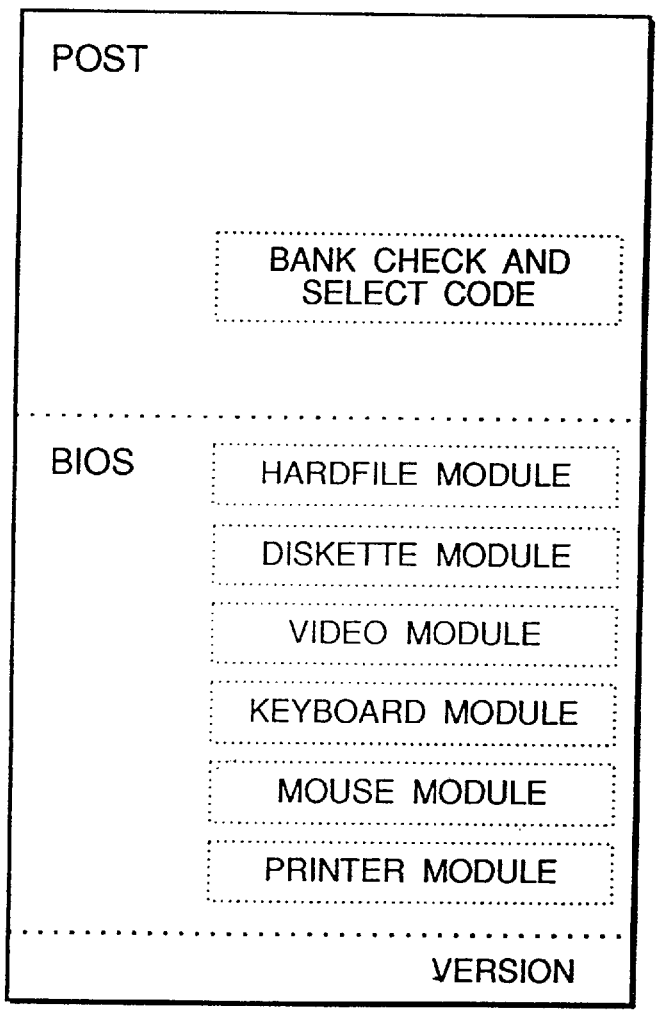
FIG. 9 is a memory map for typical firmware which is storable in a memory device of FIG. 5B.
Figure 10A:
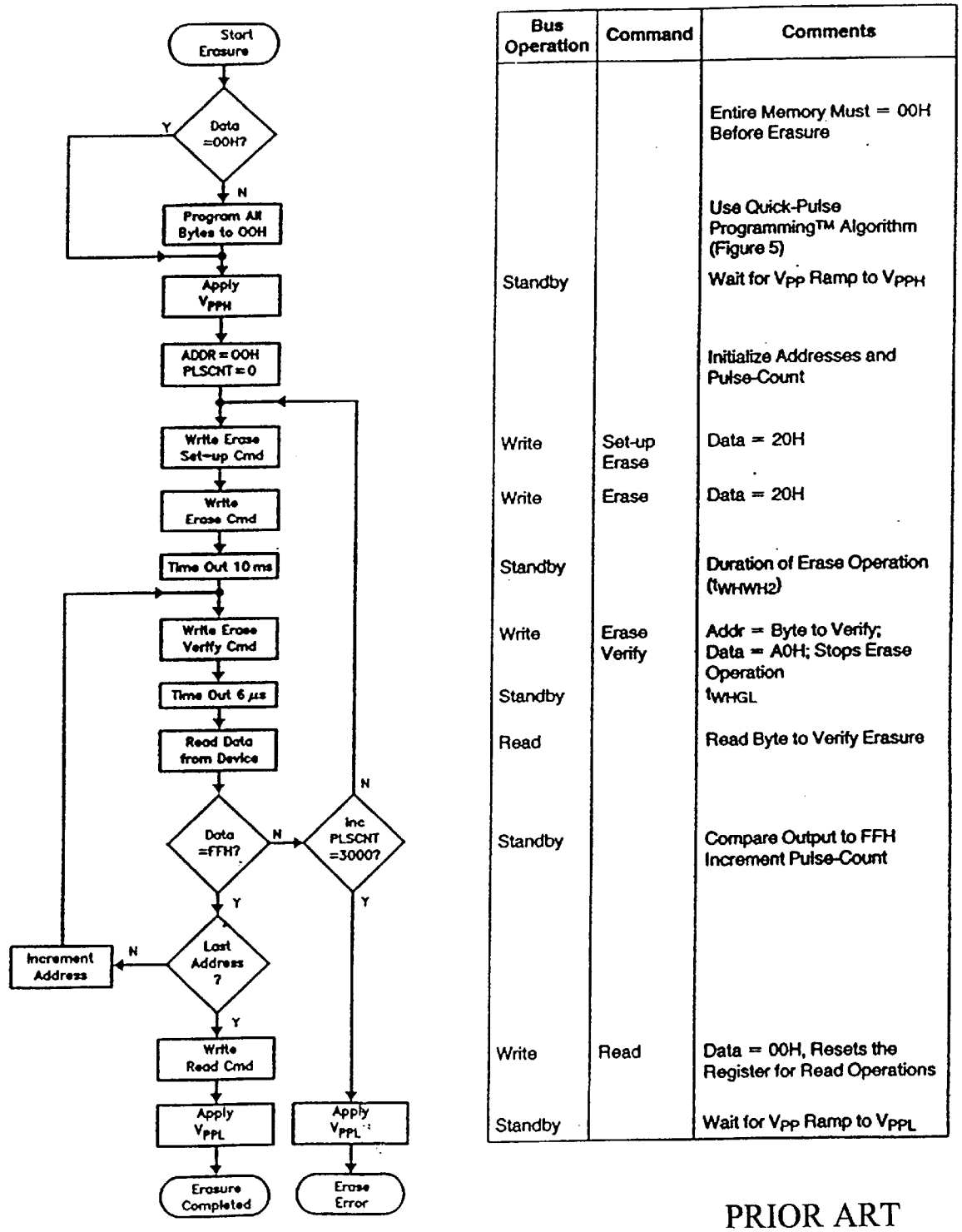
Figure 10C:
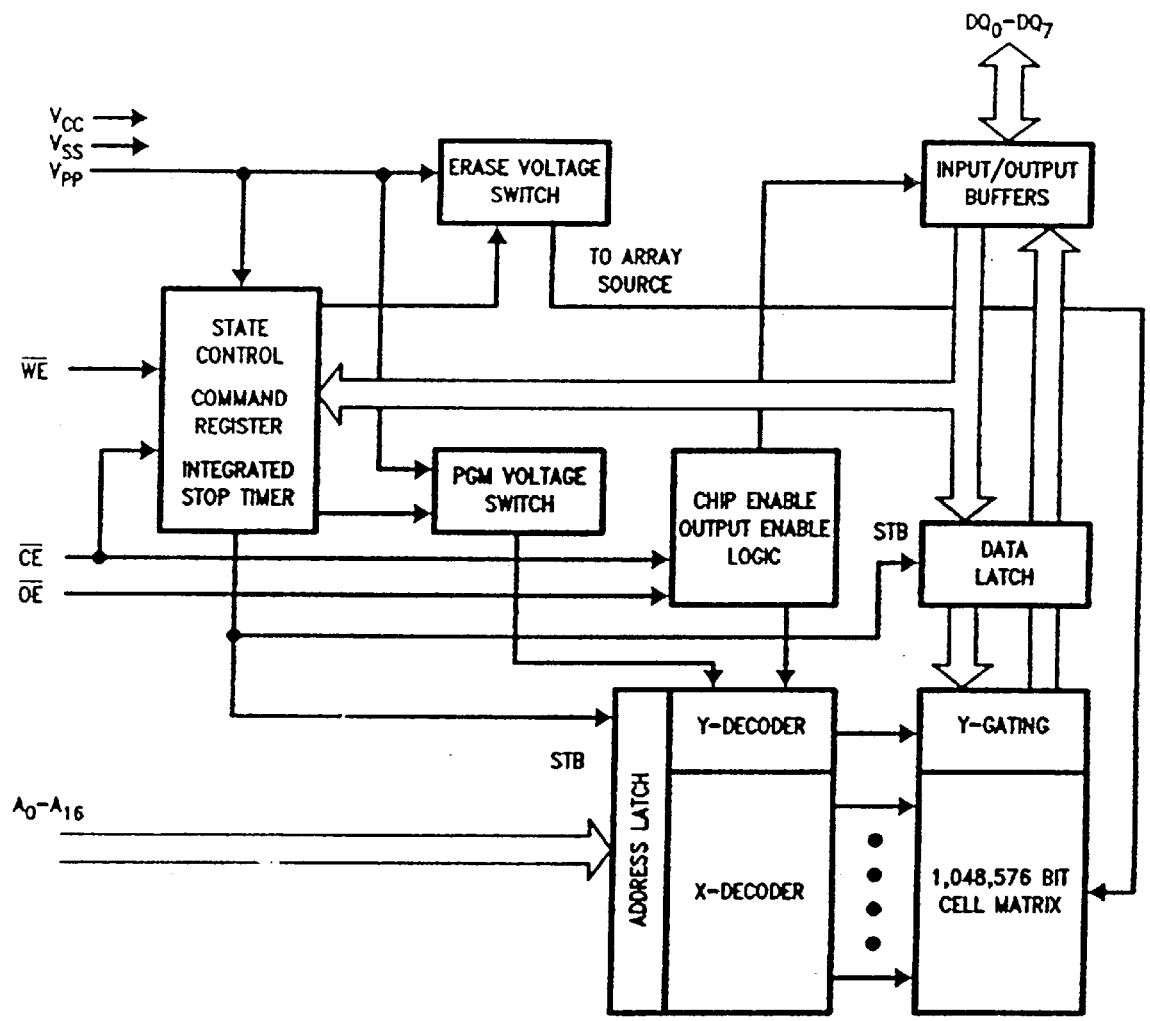
FIG. 10C is a block diagram of one Intel 28F010 Flash memory.

Returning to FIG. 7, when the bank 504 is checked (in step 706) and if the bank 504 is determined to be valid, then the Bank Check and Select code checks (in step 708) the version code present in the bank 504 against the version code present in the bank 502. This version checking can be of, for example, a version number, a sequence number, or a date value. The means to track versions is a matter of well-known design choice. A convenient version code is the date included at a fixed location near the end of an IBM personal computer firmware image (FIG. 9). If the Alternate-Bank (in this case bank 504) code is not newer than the cold-start bank code (in this case bank 502), then the system proceeds to step 712. If the code in the Alternate-Bank is newer than the code in the cold-start bank, then the Alternate-Bank is selected as active (step 710) which is done through manipulating the ALTBANK bit previously described. Because, in this example, the bank 504 has the same date as the bank 502, the Bank Check and Select code ignores the bank 504 and continues to step 712 where the code of the active bank 502 is copied into Shadow-RAM (i.e., the 128K of system RAM initialized in step 704). After the firmware image has been copied into Shadow-RAM, the Bank Check and Select code in the 64K of system RAM transfers control to the image now resident in Shadow-RAM. Thus, POST is allowed to proceed with system test and initialization, step 716. POST activities performed in step 716 are conventional and include testing and initializing the diskette adapter 246 of FIGS. 2 and 3 and performing a bootstrap load of the operating system, for example.

Figure 8:
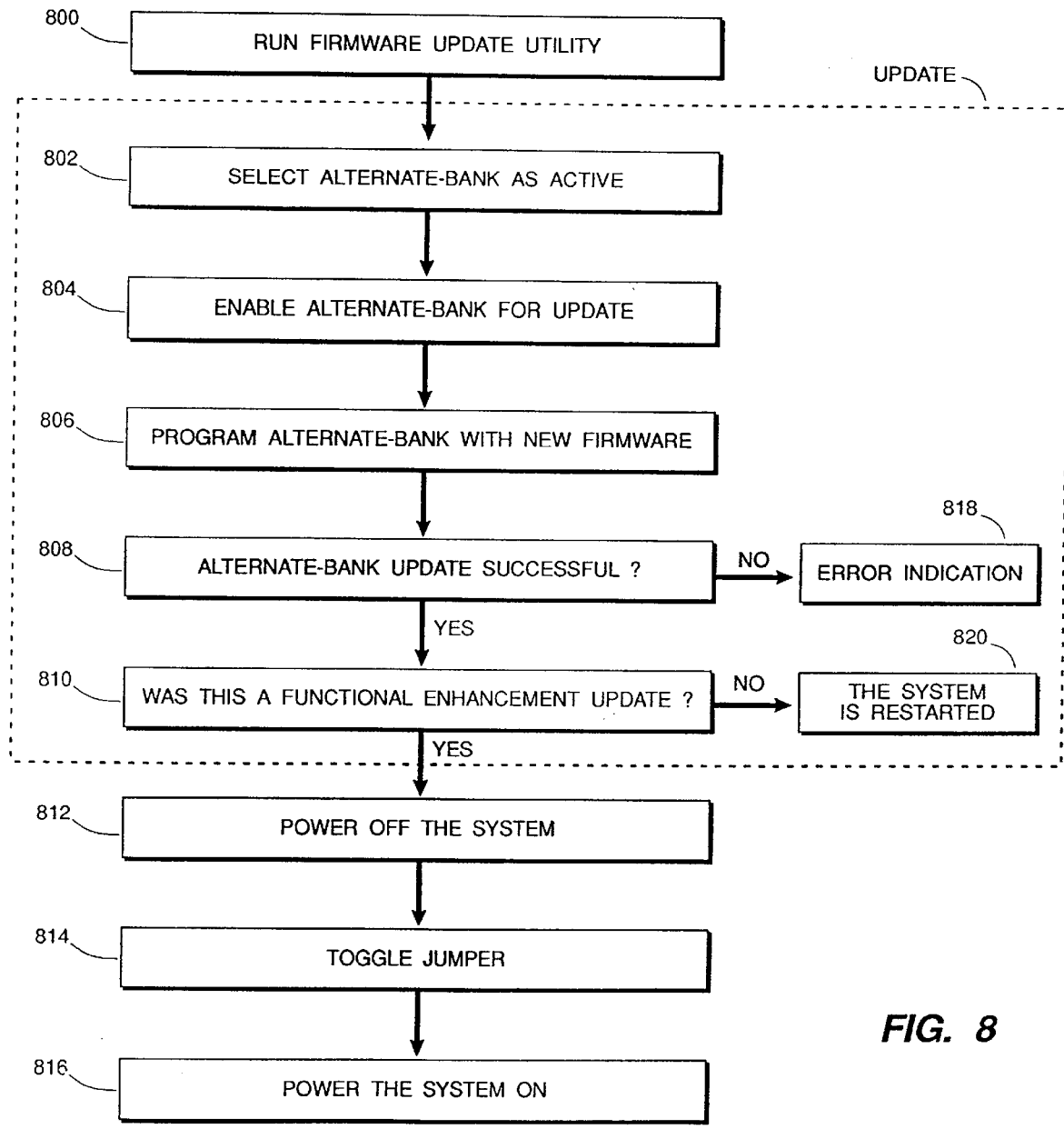
FIG. 8 is a flow diagram of a system firmware modification procedure.

In a second case (#2), it is desired to modify (e.g., update) the firmware stored within the bank 504. This update can include fixes to correct errors in the original firmware. The firmware update can be distributed on media such as diskettes. A firmware update utility program must also be included with the new firmware image. A suitable update utility program to perform the relevant steps of FIG. 8 can be coded easily by those skilled in view of the erasing and programming algorithms shown in FIG. 10A and FIG. 10B and the waveforms shown in FIGS. 11A, 11B and 11C. Both the updated firmware image and the utility program could be part of a Reference Diskette for the system. Referring now to FIG. 8, the computer system 100 must be "booted" and the update utility must be executed, step 800. Before additional steps are taken, it is preferred that the update utility reads the updated firmware code into the system RAM 264. Assuming that the jumper 604 is in the position that selects the bank 502 as the cold-start bank, the update utility program selects the Alternate-Bank 504 as active, step 802, by manipulating the ALTBANK signal. Recall that the Alternate-Bank 504 is the only bank which can receive an update. The update utility then enables the Alternate-Bank for reprogramming by manipulating the WRSEL 508 signal, step 804. The update utility program erases the old firmware code from and writes the new firmware image into the Alternate-Bank 504 (step 806) in accordance with the algorithms of FIGS. 10A and 10B. The status of the update procedure is checked to determine if the update procedure was successful, step 808. If the update procedure was successful, then the type of update is checked to determine if the update included a functional enhancement, step 810. For example, even version codes indicate a maintenance release and odd version codes indicate a functional enhancement. If the update procedure was not successful, then an error indication is given, step 818, and the user can either try the procedure again or call for service. If the update was a functional enhancement, then the system must be powered off, step 812. If the update procedure was not a functional enhancement (e.g., just a maintenance release), then the system is restarted electronically, step 820. The restart, step 820, is done to activate the new code as described in FIG. 7. After a functional enhancement, the system is powered-off, step 812, and the jumper 604 must be toggled to its alternate position, step 814. Likely, a functional enhancement to the firmware is done in conjunction with a hardware change or upgrade. Thus, the cover of the system unit 102 will need to be removed to access the jumper 604 and to perform any required hardware changes, updates, or enhancements. Note that the user can always elect to toggle the jumper 604 after any type of update. This is for the user who desires to have the latest level of firmware in the cold-start bank. The system is then powered back on, step 816.

Assuming that we just applied a maintenance release and not a functional enhancement, reinitializing the system begins the same way as previously described with respect to FIG. 7. That is, the jumper 604 has not yet been toggled. The processor begins fetching program code with the bank 502 as active. When the bank 502 firmware checks the bank 504 firmware, it finds the bank 504 firmware to be valid and of a newer version than the bank 502 firmware. At this point, program control is transferred from the bank 502 to the bank 504. The bank 504, now in control, tests and initializes the computer system 100. Thus, the computer system is now operating with the updated and corrected firmware image.

The functional enhancement case (#3) is described next. The next case #3 includes firmware updates which contain functional enhancements. For example, assume that a new video attachment feature is available. For cost or performance reasons, it may be advantageous to update an existing computer system with this new video attachment feature. However, the original firmware does not support this new video feature. So, a firmware update is required. The procedure is to obtain the updated firmware code and perform the update procedure on the computer system before any hardware changes are made. Once the firmware update is in place, the system can be opened, the old video feature (e.g., an old adapter card) removed, and the new video feature installed. Now the system can recognize and support this new video attachment.

There is a potential problem with the update procedure #3 just described. If any subsequent update procedure fails, for example, if there is a power loss during the update procedure, then the bank 504 will not contain valid firmware when the power is restored. However, it was the bank 504 which contained the firmware capable of supporting the new video attachment. Thus, when power is restored the system will be inoperable because the bank 502 does not recognize the new video attachment. The update procedure #3 for functional updates needs to be enhanced. One additional step must be added. In case #4, the firmware is updated and the system is opened and the new video feature installed as in case #3. However, before the system is closed, the jumper 604 is moved to the alternate position. Thus, the updated firmware code in the bank 504 is now selected as the cold-start bank. Note that the functional roles of the banks have just been reversed. That is, the bank 504 is the cold-start bank and is write-protected. The bank 502 is now the Alternate-Bank which can receive updates.

It is important to note that the cold-start bank cannot become corrupted either inadvertently or maliciously under direct program control because the jumper 604 also acts to write-protect the cold-start bank. Malicious corruption of the firmware could be through a virus. Only the bank which is not selected as the cold-start source (i.e., the Alternate-Bank) can be updated under direct program control. Thus, no software can alter the cold-start bank. To update the firmware contained in the cold-start bank, one must update the Alternate-Bank and then toggle the jumper 604. The integrity of the cold-start path is always guaranteed. If the new bank could not boot the system for whatever reason, then the jumper 604 could be retoggled and the update procedure reapplied; the old bank would still be intact because, if the system could not boot, an update program could not have been run.

Of course, it is not necessary to update the cold-start bank. Only a significant problem or significant functional improvement would require the cold-start bank to be changed. However, history has shown that the ability to update the ROM portion of the firmware would be very desirable in certain instances. During normal system operation, the cold-start bank would perform some very preliminary tests which will include the validity of the Alternate-Bank. If the Alternate-Bank is valid, then the cold-start bank transfers control to the Alternate-Bank, thus leaving the Alternate-Bank active and in control Of system operation. Under certain conditions, it may be advantageous to override any changeover from the cold-start bank to the Alternate-Bank. In this case an additional test, such as checking the "maintenance override" indicator, can be used. This maintenance override is sometimes called "CE override" or "Customer Engineer override." When the maintenance override is active, the cold-start bank would not switch to the Alternate-Bank even if the Alternate-Bank was found to be valid. One of the uses of the CE override, which exists on current systems and is well known, is to allow a technician servicer of the computer system to bypass any password checks which might inhibit the efficient repair of the computer system.

The firmware subsystem 242 of the invention is also valuable during the time period in which the computer system is under development. With firmware in erasable programmable read only memory (EPROM), each firmware revision would need to be programmed or "burned" into the EPROM. The procedure to burn an EPROM entails first locating an EPROM of the correct type and then erasing it through exposing it to ultraviolet light in a special erasing device. The time to erase an EPROM may vary, but it can take over ten minutes. Then, the erased EPROM must be placed into another special device called an EPROM programmer. The new firmware program code must then be loaded into this EPROM programmer which is often a time consuming operation. Then, the EPROM programmer must be instructed to transfer or burn the loaded firmware code into the EPROM device. This operation takes yet more minutes to accomplish. Then, the EPROM device must be removed from the EPROM programmer and inserted into the system under test. To insert the new EPROM, the old EPROM currently in the system must be removed. The reinoval and insertion process of these devices sometimes results in damaged hardware. It should be appreciated that the firmware subsystem 242 of the present invention, in which it normally takes no more than 15 seconds to complete the reprogramming of the Alternate-Bank, can be utilized in the system development environment, and is a significant improvement over the old EPROM scenario.

While the present invention was described above, it will be understood by those skilled in the art that various changes in detail may be made without departing from the spirit, scope, and teaching of the invention. For example, while the preferred embodiment uses Intel processors and an IBM PS/2 MICRO CHANNEL bus for illustrative purposes, this invention can be implemented on other processors and/or bus types. Likewise, those skilled in the art will recognize that many elements of the invention can be implemented i n hardware or software. Accordingly, the invention should be limited only as specified by the appended claims.

What is claimed is:

1. A method of utilizing firmware in a data processing system, comprising the steps of:

a) providing first and second non-volatile, alterable memories, each of said first and second non-volatile, alterable memories containing said firmware;

b) designating one of said first and second non-volatile, alterable memories as a cold-start memory and the other of said first and second non-volatile, alterable memories as an alternate memory;

c) performing preliminary initialization of said data processing system using said firmware from said cold start memory;

d) determining which of said cold-start memory or said alternate memory has a newer version of said firmware, and selecting whichever of said cold-start memory or said alternate memory that has said newer version of said firmware as an active memory; and e) continuing initialization of said data processing system using said newer version of said firmware from said active memory.

2. The method of claim 1, further comprising the steps of:
a) after said data processing system is initialized, selecting said alternate memory as active;
b) updating said firmware in said alternate memory; and
c) repeating said steps of performing preliminary initialization of said data processing system using said firmware from said cold-start memory, determining which of said cold-start memory or said alternate memory has a newer version of said firmware and selecting whichever of said cold-start memory or said alternate memory having said newer version of said firmware as an active memory and continuing initialization of said data processing system using said firmware from said active memory.

3. The method of claim 2, further comprising the steps of:
a) determining if said firmware contained in said alternate memory is valid after said firmware contained in said alternate memory is updated; and
b) if said firmware in said alternate memory is not valid, then selecting said cold-start memory as said active memory.

4. An apparatus for utilizing firmware in a data processing system, comprising:
a) means for providing first and second non-volatile, alterable memories, each of said first and second non-volatile, alterable memories containing said firmware;
b) means for designating one of said first and second non-volatile, alterable memories as a cold-start memory and the other of said first and second nonvolatile, alterable memories as an alternate memory;
c) means for performing preliminary initialization of said data processing system using said firmware from said cold start memory;
d) means for determining which of said cold-start memory or said alternate memory has a newer version of said firmware, and selecting whichever of said cold-start memory or said alternate memory that has said newer version of said firmware as an active memory; and
e) means for continuing initialization of said data processing system using said newer version of said firmware from said active memory.

5. The apparatus of claim 4, further comprising:
a) means for selecting said alternate memory as active after said data processing system is initialized;
b) means for updating said firmware in said alternate memory.

6. The apparatus of claim 5, further comprising:
a) means for determining if said firmware contained in said alternate memory is valid after said firmware contained in said alternate memory is updated; and
b) means for selecting said cold-start memory as said active memory if said firmware in said alternate memory is not valid.

* * * * *